United States Patent
Sanders et al.

(10) Patent No.: US 10,902,619 B2
(45) Date of Patent: Jan. 26, 2021

(54) SYSTEMS AND METHODS FOR DETERMINING QUALITY METRICS OF AN IMAGE OR IMAGES BASED ON AN EDGE GRADIENT PROFILE AND CHARACTERIZING REGIONS OF INTEREST IN AN IMAGE OR IMAGES

(71) Applicant: Duke University, Durham, NC (US)

(72) Inventors: Jeremiah W. Sanders, Durham, NC (US); Ehsan Samei, Durham, NC (US)

(73) Assignee: Duke University, Durham, NC (US)

( * ) Notice: Subject to any disclaimer, the term of this patent is extended or adjusted under 35 U.S.C. 154(b) by 240 days.

(21) Appl. No.: 15/794,680

(22) Filed: Oct. 26, 2017

(65) Prior Publication Data

US 2018/0114325 A1    Apr. 26, 2018

Related U.S. Application Data

(60) Provisional application No. 62/412,964, filed on Oct. 26, 2016.

(51) Int. Cl.
*G06T 7/00* (2017.01)
*G06T 7/269* (2017.01)
(Continued)

(52) U.S. Cl.
CPC .............. *G06T 7/269* (2017.01); *G06T 5/001* (2013.01); *G06T 5/40* (2013.01); *G06T 5/50* (2013.01);
(Continued)

(58) Field of Classification Search
CPC .............. G06T 7/00; G06T 7/10–7/194; G06T 7/0012–7/0016; G06T 7/269;
(Continued)

(56) References Cited

U.S. PATENT DOCUMENTS

| 2002/0061142 A1* | 5/2002 | Hiramatsu | .............. G06T 5/008 382/254 |
| 2009/0185733 A1* | 7/2009 | Heinlein | ................ A61B 6/502 382/132 |

(Continued)

OTHER PUBLICATIONS

"Patient-specific quantification of image quality: An automated method for measuring spatial resolution in clinical CT images" Medical Physics, vol. 43, Issue 10 Sep. 6, 2016.*

(Continued)

*Primary Examiner* — Sean T Motsinger
(74) *Attorney, Agent, or Firm* — Olive Law Group, PLLC

(57) ABSTRACT

Disclosed herein are systems and methods for determining quality metrics of images based on an edge gradient profile and characterizing regions of interest in an image or images. According to an aspect, a method includes using an imaging device to acquire one or more images including at least a portion of an organ of a subject. The method also includes computing an edge profile across an organ interface of a subject. The method also includes computing an edge gradient profile from the edge profile of a subject. The method also includes computing a image quality metric related to the spatial resolution of the image or images from the edge gradient profile. The method also includes defining multiple regions of interest within the portion of the organ. Further, the method includes characterizing the regions of interest based on predetermined criteria. The method also includes presenting the characterization of the edge gradient profile and characterization of the regions of interest to a user.

26 Claims, 18 Drawing Sheets

(51) Int. Cl.
  G06T 7/12      (2017.01)
  G06T 5/40      (2006.01)
  G06T 5/00      (2006.01)
  G06T 5/50      (2006.01)
  G06T 7/11      (2017.01)
(52) U.S. Cl.
  CPC .............. *G06T 7/0012* (2013.01); *G06T 7/11* (2017.01); *G06T 7/12* (2017.01); *G06T 2207/10081* (2013.01); *G06T 2207/20104* (2013.01); *G06T 2207/30004* (2013.01); *G06T 2207/30088* (2013.01); *G06T 2207/30168* (2013.01)
(58) Field of Classification Search
  CPC .. G06T 5/001; G06T 5/40; G06T 5/50; G06T 2207/10081; G06T 2207/20104; G06T 2207/30004; G06T 2207/30088; G06T 2207/30168
  See application file for complete search history.

(56) References Cited

U.S. PATENT DOCUMENTS

| | | | | |
|---|---|---|---|---|
| 2010/0172567 | A1* | 7/2010 | Prokoski | A61B 5/0064 382/132 |
| 2015/0379726 | A1* | 12/2015 | Kawamura | A61B 6/5264 382/103 |
| 2016/0038108 | A1* | 2/2016 | Tamura | A61B 6/032 378/16 |
| 2018/0114325 | A1* | 4/2018 | Sanders | G06T 7/12 |
| 2018/0253831 | A1* | 9/2018 | Nanu | H04N 5/23212 |
| 2018/0328864 | A1* | 11/2018 | Harada | A61B 6/461 |
| 2018/0368707 | A1* | 12/2018 | De Haan | A61B 5/7257 |
| 2019/0026608 | A1* | 1/2019 | Hsieh | G06N 3/0454 |
| 2019/0279342 | A1* | 9/2019 | Nanu | G06K 9/44 |
| 2019/0287241 | A1* | 9/2019 | Hill | G06T 7/0012 |

OTHER PUBLICATIONS

Christianson, O., et al., Automated size-specific CT dose monitoring program: assessing variability in CT dose. Medical physics, 2012. 39(11): p. 7131-7139.
Boos, J., et al., Dose monitoring using the DICOM structured report: assessment of the relationship between cumulative radiation exposure and BMI in abdominal CT. Clinical radiology, 2015. 70(2): p. 176-182.
Greenwood, T.J., et al., CT dose optimization in pediatric radiology: a multiyear effort to preserve the benefits of imaging while reducing the risks. RadioGraphics, 2015. 35(5): p. 1539-1554.
Organization, W.H., Applying radiation safety standards in diagnostic radiology and interventional procedures using x rays. 2006.
Smith-Bindman, R., et al., Radiation dose associated with common computed tomography examinations and the associated lifetime attributable risk of cancer. Archives of internal medicine, 2009. 169(22): p. 2078-2086.
MacGregor, K., et al., Identifying institutional diagnostic reference levels for CT with radiation dose index monitoring software. Radiology, 2015. 276(2): p. 507-517.
Paolicchi, F., et al., Optimizing the balance between radiation dose and image quality in pediatric head CT: findings before and after intensive radiologic staff training. American Journal of Roentgenology, 2014. 202(6): p. 1309-1315.
Luo, S., X. Li, and J. Li, Review on the methods of automatic liver segmentation from abdominal images. Journal of Computer and Communications, 2014.2(02): p. 1.
Zarb F. L. Rainford, and M.F. McEntee, Developing optimized CT scan protocols: Phantom measurements of image quality. Radiography, 2011. 17(2): p. 109-114.
Ding, A., et al., VirtualDose: a software for reporting organ doses from CT for adult and pediatric patients. Physics in medicine and biology, 2015. 60(14): p. 5601.
Wilson, J.M., et al., A methodology for image quality evaluation of advanced CT systems. Medical physics, 2013. 40 (3): p. 031908.
Christianson, O., et al., Automated technique to measure noise in clinical CT examinations. American Journal of Roentgenology, 2015. 205(1): p. W93-W99.
Sanders, J., L. Hurwitz, and E. Samei, Patient-specific quantification of image quality: an automated method for measuring spatial resolution in clinical CT images, Accepted in Medical Physics, 2016.
Smistad, E., et al., Medical image segmentation on GPUs—A comprehensive review. Medical image analysis, 2015. 20(1): p. 1-18.
Kumar, V., et al., Radiomics: the process and the challenges. Magnetic resonance imaging, 2012. 30(9): p. 1234-1248.
Liu, F., et al., Liver segmentation for CT images using GVF snake. Medical physics, 2005. 32(12): p. 3699-3706.
Lim, S.-J., Y.-Y. Jeong, and Y.-S. Ho, Automatic liver segmentation for volume measurement in CT Images. Journal of Visual Communication and Image Representation, 2006. 17(4): p. 860-875.
Massoptier, L. and S. Casciaro, A new fully automatic and robust algorithm for fast segmentation of liver tissue and tumors from CT scans. European radiology, 2008. 18(8): p. 1658-1665.
Heimann, T., et al., Comparison and evaluation of methods for liver segmentation from CT datasets. IEEE transactions on medical imaging, 2009.28(8): p. 1251-1265.
Tong, T., et al., Discriminative dictionary learning for abdominal multi-organ segmentation. Medical image analysis, 2015. 23(1): p. 92-104.
Wolz, R., et al., Automated abdominal multi-organ segmentation with subject-specific atlas generation. IEEE transactions on medical imaging, 2013. 32(9): p. 1723-1730.

* cited by examiner

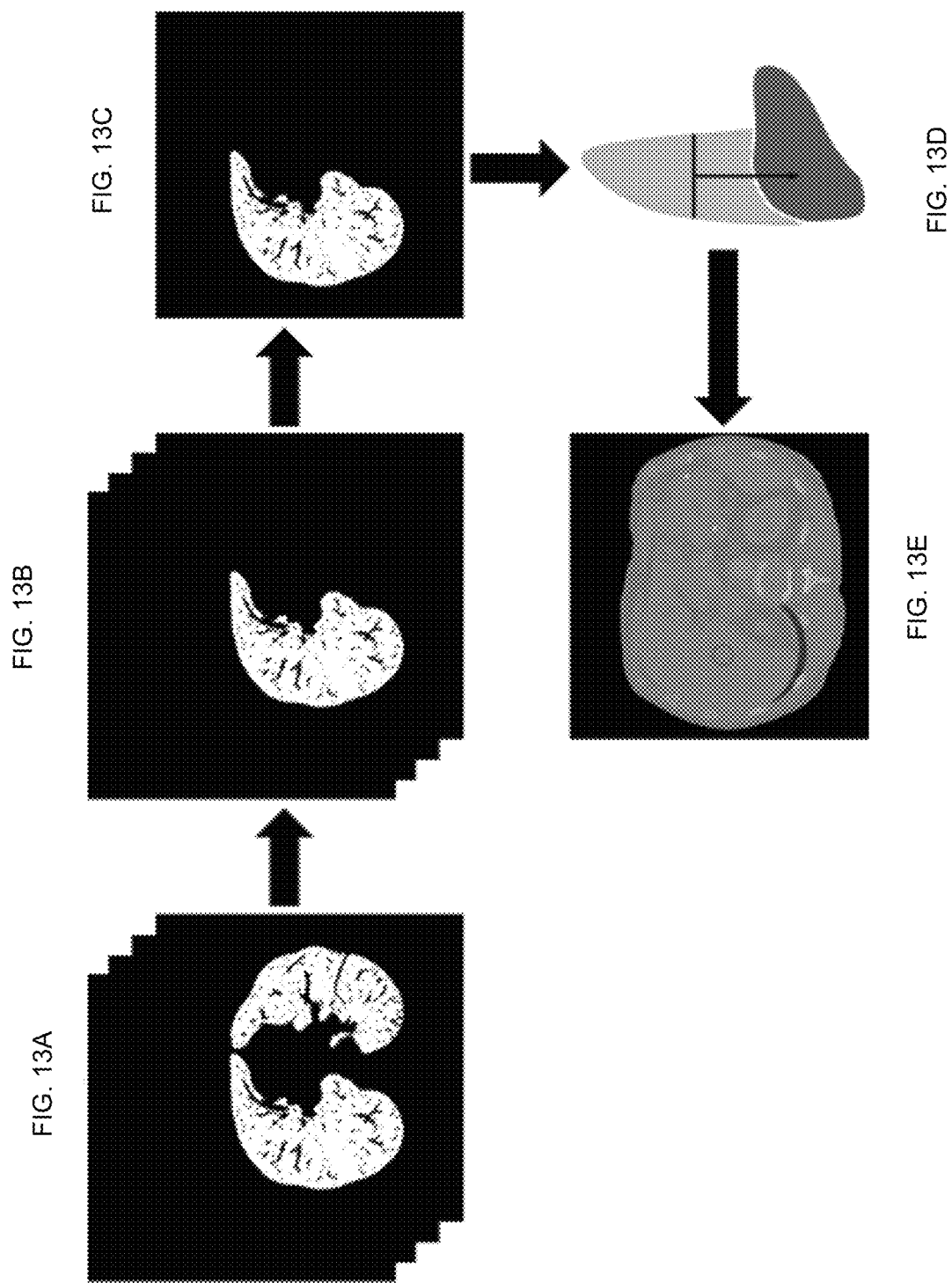

SYSTEMS AND METHODS FOR DETERMINING QUALITY METRICS OF AN IMAGE OR IMAGES BASED ON AN EDGE GRADIENT PROFILE AND CHARACTERIZING REGIONS OF INTEREST IN AN IMAGE OR IMAGES

CROSS REFERENCE TO RELATED APPLICATION

This application claims priority to U.S. Provisional Patent Application No. 62/412,964, filed Oct. 26, 2016, and titled AUTOMATED METHODS FOR MEASURING RESOLUTION AND CONTRAST IN CLINICAL COMPUTED TOMOGRAPY IMAGES, the disclosure of which is incorporated herein by reference in its entirety.

TECHNICAL FIELD

The presently disclosed subject matter relates to imaging systems. More particularly, the presently disclosed subject matter relates to systems and methods for determining a quality metric of images based on an edge gradient profile and characterizing regions of interest in images.

BACKGROUND

The utility of computed tomography (CT) in the clinic has been well established as evidenced by the more than 70 million CT exams performed every year. Consequently, CT has become the largest contributor to population doses amongst all medical imaging modalities that utilize ionizing radiation. Acknowledging the fact that ionizing radiation poses a health risk, there exists the need to strike a balance between diagnostic benefit and radiation dose. While characterization of dose for individual patients has received widespread attention and mandate, image quality tracking has not been as well recognized. However, to ensure that CT scanners are optimally used in the clinic, an understanding and characterization of both image quality and radiation dose are needed. Moreover, CT systems are ever-expanding in terms of technology and application. Therefore, delicacy and performance of these new advancements in terms of dosimetry and image quality should be quantitatively measured and periodically monitored to ascertain the overall quality, consistency, and safety.

Image quality assessments are generally addressed using three primary image quality metrics: spatial resolution, noise, and image contrast. Currently, these metrics are generally characterized in static phantoms and ascribed to CT systems and protocols. However, the key objective for image quality assessment should be its quantification in clinical images; that is the most clinically-relevant characterization of image quality as it is most directly related to the actual quality of the clinical image(s). Phantom measurements are relevant, but only to the extent that they reflect attributes of actual clinical images. For characterizing contrast specifically, the general approach is to imbed inserts made of materials with various densities into a uniform phantom and measure the mean voxel value inside each insert. This method is sufficient for characterizing contrast for static, uniformly shaped objects. However, clinical images are subject to a number of variabilities associated with patient size, heterogeneity, motion, photon flux, and contrast perfusion that are not reflected in phantom-based measurements. As such, phantom-based measurements are not sufficient to capture all relevant information related to the spatial resolution and image contrast observed clinically. Methods to measure spatial resolution and contrast in clinical images would be most helpful to quantify image quality in a patient-specific manner. Such a method, in combination with patient-based noise and resolution estimations, could be used to monitor clinical protocols in an effort to quantify overall image quality and consistency. Since many images are acquired every day in the clinic, the image quality monitoring algorithms should be fully automated, fast, and robust. Currently, there is not a unified package in clinical operations that automatically measures and monitors clinical image spatial resolution and contrast. Accordingly, there is need to provide improved systems and techniques for presenting quality information for CT images in a clinical setting.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for determining quality metrics of images based on an edge gradient profile and characterizing regions of interest in images. According to an aspect, a method includes using an imaging device to acquire one or more images of a subject. The method also includes defining skin of the subject in the acquired one or more images. Further, the method includes characterizing edge sharpness across the skin of the subject via edge profile measurements. The method also includes grouping the edge profile measurements by a radial distance of the edge profiles from an isocenter of the imaging device to generate oversampled edge profile measurements. Further, the method includes determining the oversampled edge profiles that are a predetermined amount of in-plane resolution for obtaining an edge gradient profile. The method also includes determining a quality metric of the acquired one or more images based on the edge gradient profile.

According to another aspect, a method includes using an imaging device to acquire one or more images including at least a portion of an organ of a subject. The method also includes defining multiple regions of interest within the portion of the organ. Further, the method includes characterizing the regions of interest based on predetermined criteria. The method also includes presenting the characterization of the regions of interest to a user.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. A brief description of the drawings follows.

FIG. 13A-13E are images showing a sequence of a flow diagram of an example method for determining the liver HU histogram.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

Articles "a" and "an" are used herein to refer to one or to more than one (i.e., at least one) of the grammatical object of the article. By way of example, "an element" means at least one element and can include more than one element.

Unless otherwise defined, all technical terms used herein have the same meaning as commonly understood by one of ordinary skill in the art to which this disclosure belongs.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be, for example, a server. In another example, a computing device may be a mobile computing device such as, for example, but not limited to, a smart phone, a cell phone, a pager, a personal digital assistant (PDA), a mobile computer with a smart phone client, or the like. A computing device can also include any type of conventional computer, for example, a laptop computer, a desktop computer, or a tablet computer.

In accordance with embodiments, automated systems and methods are provided to measure spatial resolution and image contrast in CT images for monitoring quality of routine image acquisitions as well as quantitatively measuring delicacy and consistency of imaging techniques in the clinic. As an example, the CT images can be CT chest images. The systems and methods may be used on both contrast enhanced and non-contrast enhanced datasets. An example method can be based on automatically sampling the lung tissue and liver to measure the histogram of the Hounsfield units (HUs) inside these organs. A method in accordance with embodiments was validated against manual measurements in contrast enhanced and non-contrast enhanced clinical chest CT datasets. A second example method can be based on automatically measuring an edge gradient profile across the air/skin interface of the patient. This measurement could be used to extract a quality metric related to the spatial resolution of the image or images through differentiation of the edge gradient profile and Fourier analysis.

Figure 1:
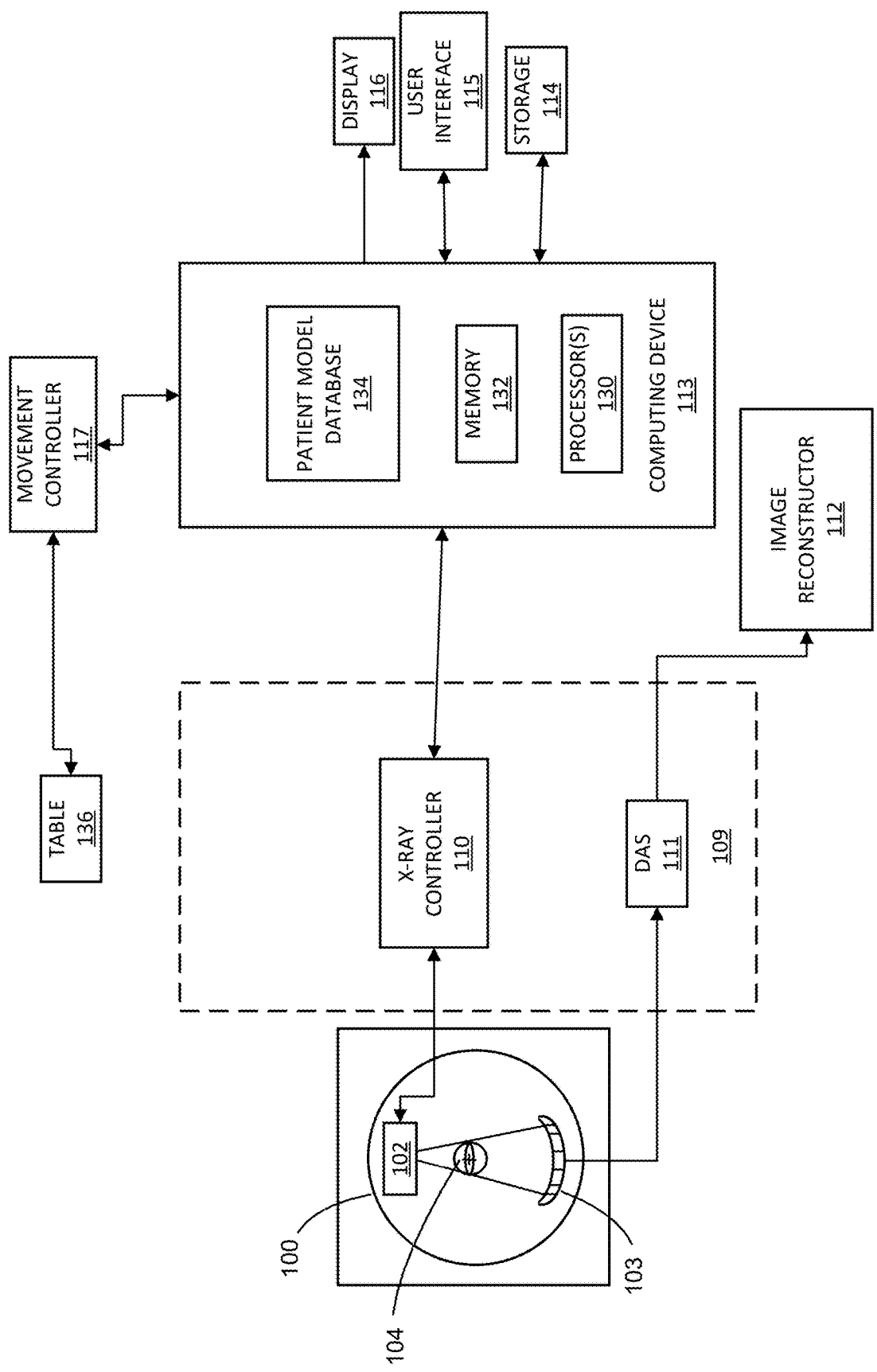
FIG. 1 is a schematic diagram of an example CT imaging system for determining a quality metric of an acquired CT image or images in accordance with embodiments of the present disclosure.

FIG. 1 illustrates a schematic diagram of an example CT imaging system for determining a quality metric of an acquired CT image in accordance with embodiments of the present disclosure. Referring to FIG. 1, the system includes a rotational gantry 100 that is rotatable about a longitudinal axis of a patient's body 104 or any other object to be examined. The gantry 100 may include one or more x-ray sources or tubes 102 that are configured to project a beam of x-rays towards an x-ray detector array 103 placed at the opposite side of the gantry 100. The x-ray detector array 103 can be equipped with multiple detector elements which can together sense the projected x-rays passing through the patient's body 104 to be examined between x-ray detector array 103 and x-ray source(s) 102. Each detector element can generate an electrical signal that represents the intensity of an impinging x-ray beam and can hence be used to estimate the attenuation of the beam as it passes through the object.

In a rotational CT scanner such as depicted in FIG. 1, a 3D volume can be calculated by reconstructing and stacking individual 2D slices. Some CT imaging systems can employ 2D detector arrays, allowing the acquisition of a truly 3D data sets. As shown, only a single row of detector elements is shown (i.e., a detector row). However, a multi-slice detector array may include multiple parallel rows of detector elements such that projection data corresponding to multiple quasi-parallel or parallel slices can be acquired simultaneously during a scan. The detector elements may completely encircle the patient 104. This figure shows only a single x-ray source 102, but it should be understood that multiple x-ray sources may be positioned around gantry 100.

Operation of x-ray source 102 can be governed by a control mechanism 109 of the system. Control mechanism 109 can include an x-ray controller 110 that provides power and timing signals to the x-ray source 102. A data acquisition system (DAS) 111 belonging to the control mechanism 109 can sample analog data from detector elements and can convert the data to digital signals for subsequent processing. An image reconstructor 112 can receive sampled and digitized x-ray data from DAS 111 and can perform high-speed image reconstruction. The reconstructed image can be applied as an input to a computing device 113 (e.g., a desktop or laptop computer), which stores the image in a mass storage device 114. The computing device 113 may include hardware, software, firmware, or combinations thereof for implementing the functionality described herein. For example, the computing device 113 may include one or more processors 130 and memory 132. The image reconstructor 112 may be specialized hardware residing in the computing device 113 or a software program executed by the computing device 113.

The computing device 113 may receive signals via a user interface or graphical user interface (GUI). Particularly, the computing device 113 may receive commands and scanning parameters from a user interface 115 that includes, for example, a keyboard and mouse (not shown). An associated display 116 can allow an operator to observe the reconstructed image and other data from the computing device 113. The operator-supplied commands and parameters can be used by the computing device 113 to provide control signals and information to the x-ray controller 110, DAS 111, and a table motor controller 117 in communication with a patient table 136, which controls a motorized patient table 136 so as to position patient 104 in gantry 101. Particularly, patient table 136 can move the patient 104 through a gantry opening.

The computing device 113 may be used for implementing functionality described herein. Particularly, for example, the computing device 113 may include hardware, software, firmware, and combinations thereof for implementing the methods and techniques disclosed herein. For example, the methods and techniques may be implemented by the processor(s) 130 and memory 132 as will be understood by those of skill in the art. Further, a user may suitably interact with the user interface 115 for implementing the functions and for presenting results to the user.

Figure 2:
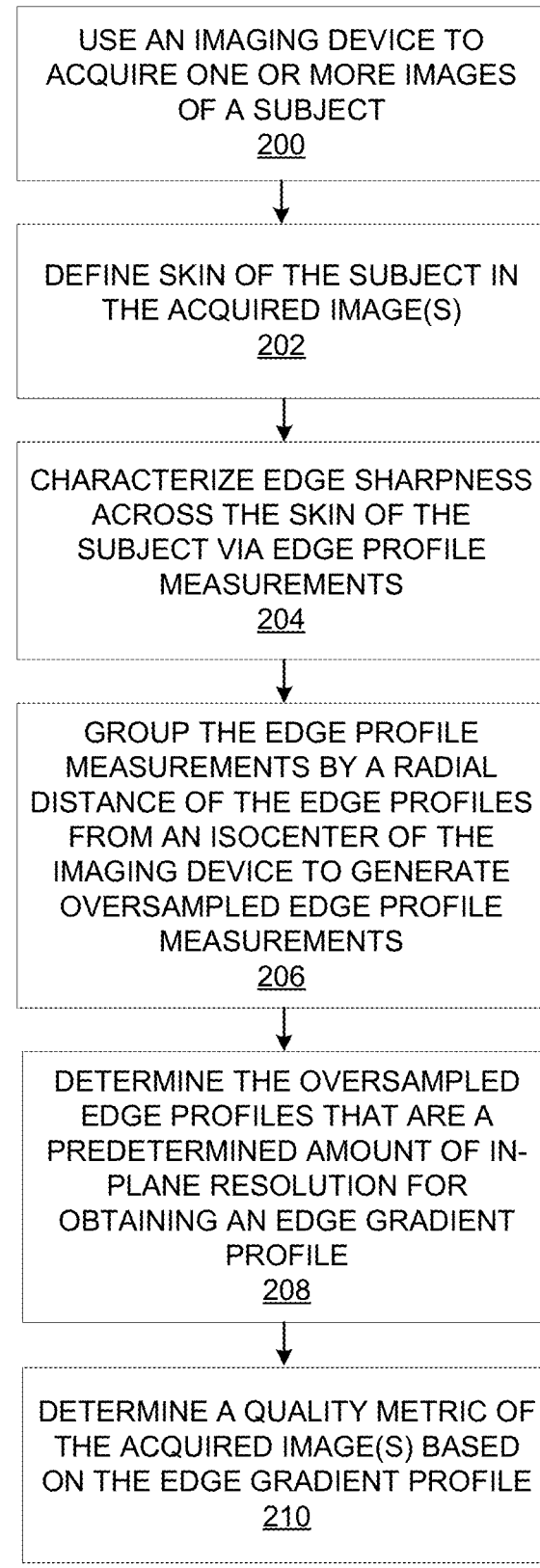
FIG. 2 is a flow diagram of an example method for determining a quality metric of an acquired CT image or images in accordance with embodiments of the present disclosure.

FIG. 2 illustrates a flow diagram of an example method for determining a quality metric of an acquired CT image in accordance with embodiments of the present disclosure. In this example, the method is described as being implemented by the system shown in FIG. 1, although it should be understood that the method may be implemented by any other suitable imaging system. Alternative systems may be CT imaging systems or non-CT imaging system, such as magnetic resonance imaging (MRI).

Referring to FIG. 2, the method includes using 200 an imaging device to acquire one or more images of a subject. For example, the system of FIG. 1 may be operated to acquire multiple CT images of a portion of the patient's body 104. The system may direct x-rays towards and through the body 104. The detector elements of the x-ray detector array 103 may receive the x-rays projected through the body 104. The DAS 111 can receive analog data from the detector elements and can convert the data to digital signals representative of the body 104. The image reconstructor 112 can perform image reconstruction of the digital signals and output the reconstructed image data to the computing device 113.

The method of FIG. 2 includes defining 202 skin of the subject in the acquired image(s). Continuing the aforementioned example, the computing device 113 shown in FIG. 1 may segment each patient from the acquired image(s) using a suitable thresholding technique. A thresholding technique may be used for segmentation. Subsequently, a polygon or polyhedron mesh of the patient may be constructed from the segmented dataset. In an example, processor(s) 130 and memory 132 of the computing device 113 may implement any suitable software for segmenting and mesh generation. The exterior faces of the elements may define an interface between the ambient air and the patient's skin. The computing device 113 may use the processor(s) 130 and memory 132 for implementing these and other techniques for defining the skin of the subject in acquired images.

The method of FIG. 2 includes characterizing 204 edge sharpness across the skin of the subject via edge profile measurements. Further, the method of FIG. 2 includes grouping 206 the edge profile measurements by a radial distance of the edge profiles from an isocenter of the imaging device to generate oversampled edge profile measurements. The method of FIG. 2 includes determining 208 the oversampled edge profiles that are a predetermined amount of in-plane resolution for obtaining an edge gradient profile. Continuing the aforementioned example, processor(s) 130 and memory 132 of the computing device 113 may make edge spread function (ESF) measurements across the patient's skin. Subsequently, processor(s) 130 and memory 132 of the computing device 113 may bin the ESF measurements by their radial distance from the scanner isocenter to construct oversampled ESF measurements. Processor(s) 130 and memory 132 of the computing device 113 may subsequently bin the oversampled ESF measurements by a fraction of the in-plane pixel size and differentiate to obtain the line spread function (LSF).

The method of FIG. 2 includes determining 210 a quality metric of the acquired one or more images based on the edge gradient profile. Continuing the aforementioned example, processor(s) 130 and memory 132 of the computing device 113 may calculate the Fourier transform of the LSF and normalize by the value at zero to obtain a CT spatial resolution index (RI) analogous to the modulation transfer function (MTF). The RIs measured from patient images may be validated against established MTFs measured from an image quality phantom and with the aid of an observer study.

In a study, twenty-one clinical multidetector CT (MDCT) datasets were utilized. The MDCT exams are a subset from a database that was generated with local IRB approval and HIPPA compliance. Exams were performed on a dual source 256 MDCT scanner (Siemens Definition Flash available from Siemens Medical Systems, Forscheim Germany) using standard adult clinical MDCT protocols, 120 kV tube potential, and a pitch of 0.8. The projection data were used for this study, allowing for multiple reconstructions with various reconstruction techniques. The database contained adult CT datasets with body mass indices ranging from normal to overweight. The exams consisted of chest and abdominopelvic cases with CTDIvol values ranging from 5.53 to 12.45 mGy, dose-length product (DLP) values ranging from 148.94 to 956.90 mGy-cm, and effective mAs values ranging from 58 to 184 mAs. The datasets included both males and females.

A quality control phantom (e.g., Mercury Phantom V3.0) was scanned using an adult abdominopelvic protocol, 120 kV tube potential, and a pitch of 0.6. The CTDIvol, DLP, and effective mAs were 20.16 mGy, 1017.53 mGy-cm, and 300 mAs, respectively. It is noted that, in the alternative, any other suitable quality control phantom may be used.

The algorithm for measuring the RI from clinical CT images included the following steps: (1) segmentation of the patient's body from the image to create a binary volume; (2) generating the polygon or polyhedron mesh of the patient;

and (3) measuring the ESF across the air-skin interface of the patient and calculating the RI from the ESF measurements. All analyses were applied across the clinical CT datasets.

The patient's body was segmented from the image using a multi-thresholding technique. The table cushion that patients lay on can pose a problem for segmentation because it often times has a similar Hounsfeld unit (HU) to skin. Passing the image through multiple thresholds increases the likelihood of eliminating the cushion from the segmented volume. Seven thresholds were selected by manually finding the optimal thresholds from a database of CT images that were unrelated to this study. The threshold values that were used were −475, −190, −165, −175, −150, −155, −400, and −200. For each threshold value, a binary mask is created where the voxels in the CT dataset that exceed the threshold are assigned a value of "1" in the binary mask and a value of "0" otherwise. A morphological hole filling operation was subsequently applied to fill in the enclosed lower density regions. The seven binary masks were added together to create an intensity map. The voxels in the intensity map with a value of "7" were identified as the patient and a binary volume of the patient was created based on these voxels. Values less than 7 in the intensity map were identified as the background. Other techniques for segmenting the patient from background objects can be used for this step. Although, the end result should be a segmentation mask where voxels identified as the patient are assigned a value of 1 and voxels identified as the background are assigned a value of 0.

An open source mesh generation toolbox, iso2mesh, was used to reconstruct the patient's body from their CT dataset. Any other suitable software toolbox may be used. The "v2m" function in the toolbox was used for this project. It requires the binary volume of the patient along with user-defined constants, including the size of the mesh. The size of the mesh defines how large the elements are, which determines the number of ESF measurements that can be made. Increasing the mesh size increases the area of the triangular faces of the mesh. A smaller mesh results in more ESF measurements; however, more ESF measurements increase the time needed to run the algorithm because more ESF data are generated. Mesh sizes of integer values between two and seven, inclusive, were investigated. A mesh size of three provided the best trade-off between overall computation time and the total amount of data acquired.

Figure 3:
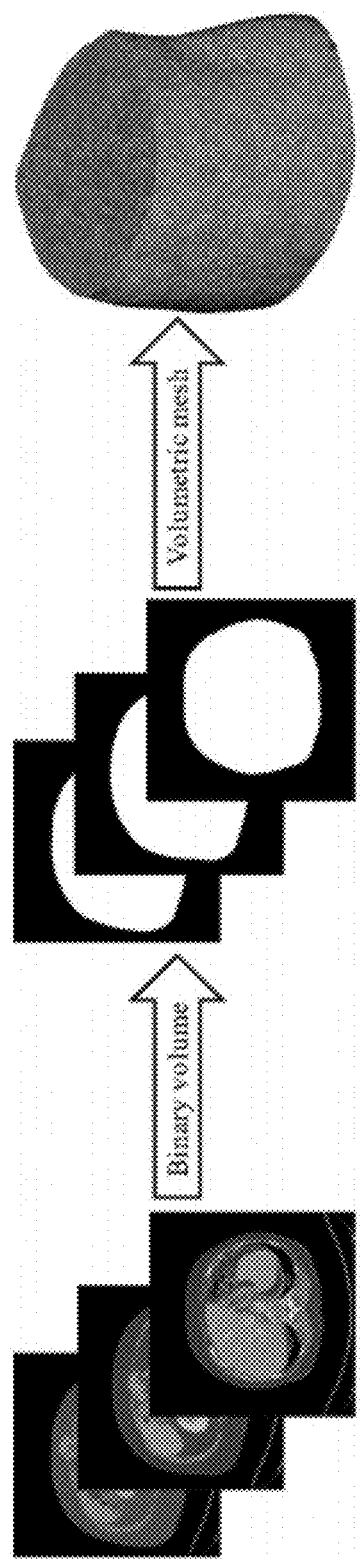
FIG. 3 are different images representing a sequence of an example method for generating the polyhedron mesh of a patient in accordance with embodiments of the present disclosure.

The outputs of the v2m function that were used are the coordinates of the vertices that makeup the mesh elements and a list of the exterior faces of the mesh. Two additional functions, "meshcentroid" and "surfacenorm," were used to determine the centroid of each face and the unit normal vector to each face, respectively. An example procedure for constructing the polygon or polyhedron mesh of the patient from their CT dataset is depicted in FIG. 3. Particularly, FIG. 3 illustrates different images representing a sequence of an example method for generating the polygon or polyhedron mesh of a patient in accordance with embodiments of the present disclosure. Referring to FIG. 3, the patient dataset is segment using a multi-thresholding technique to isolate the patient from the surrounding objects, resulting in a binary volume of the patient. The binary volume is input into an open source mesh generation toolbox to create a mesh of the patient using polygon or polyhedron elements.

One side of each face of the mesh contains the ambient air, and the other side contains the patient. As such, the faces of the mesh define a region of high contrast that outlines an interface between the ambient air and the patient's skin. The circle of maximum diameter that encloses each face was determined. The pixels in the CT dataset that were enclosed by the circles were used as the starting points for the ESF measurements, which were made across the air-skin interface in a direction normal to the face using a suitable method. The "coupling effect" between in-plane and out-of-plane spatial resolutions can be insignificant up to ±15. Therefore, only faces with unit normals within ±10 degrees of the x-y plane were used to make ESF measurements to limit the contamination from adjacent slices. The distance from the center of the image to the centroid of each face was stored to group the measurements by their radial distance from the isocenter. This was done to account for the radial dependence of the MTF.

The ESF measurements were filtered twice to remove those that were contaminated. The first filter removes the ESF measurements that pass through the patient's clothing. A threshold of −925 was determined by finding the average HU of clothing from a database of unrelated images. Measurements that exceed the clothing threshold on the left (air) tail of the ESF were rejected. The second filter removed measurements that cross outside of the circular field of view (FOV). This step was included primarily for large patients that were close to or outside of the FOV.

Figure 4:
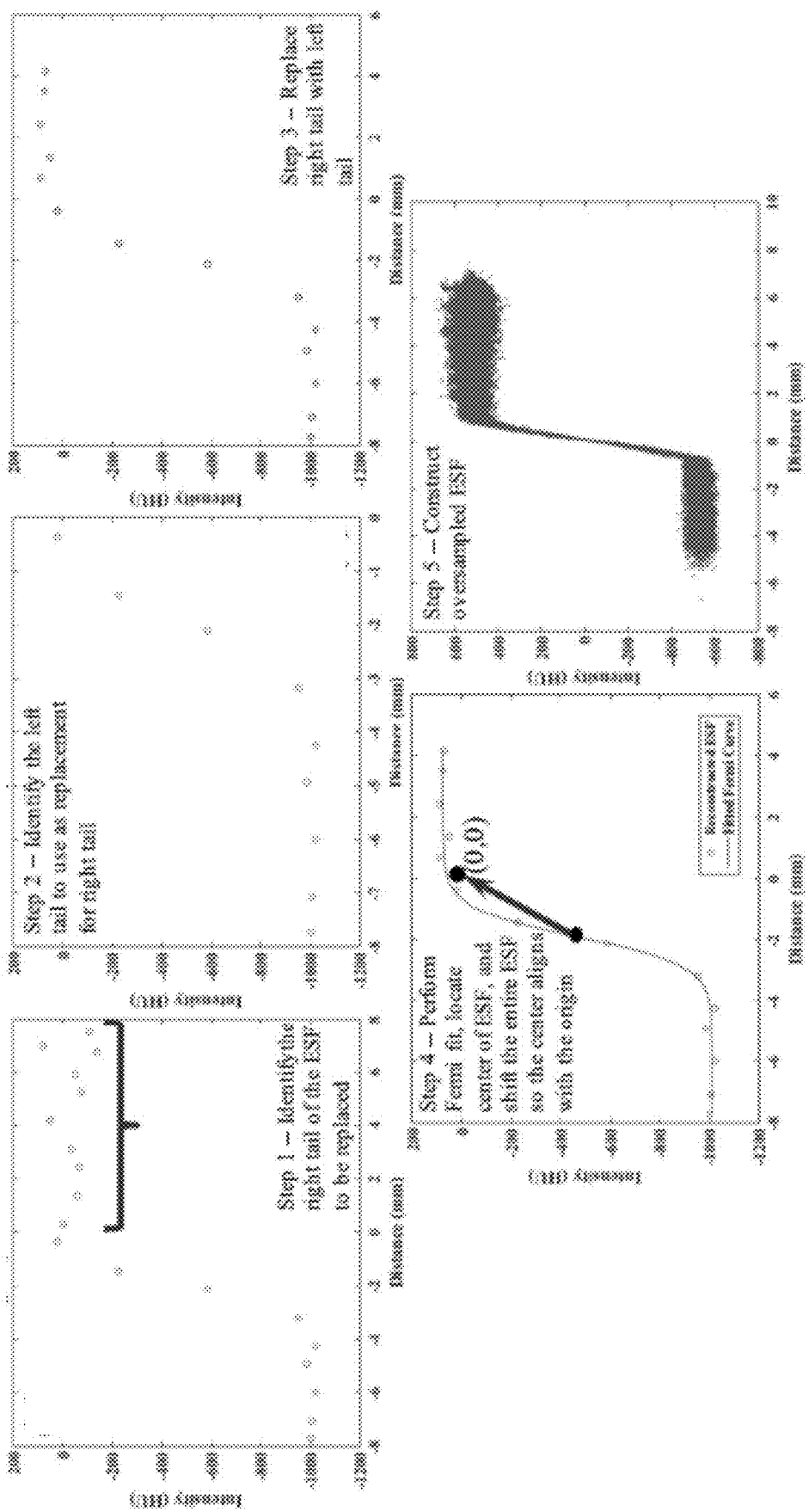
FIGS. 4A-4E are graphs showing an example method for reconstructing the right tail of the edge profile (embodied as an edge-spread function, ESF) with the left tail.

The section of the ESF measurements inside the patient's body can be sporadic due to the irregularity of HUs inside the body. Proceeding with the original right tail may ultimately lead to erroneous results in the frequency domain. To overcome this, the right tail was replaced with a copy of the left tail that has been rotated by 180 degrees. First, for a given edge profile measurement, the derivative may be calculated. Subsequently, going from left to right, the point where the edge profile initially begins to increase is identified. All of the points of the edge profile to the left of this location are considered to be the air (left) side of the edge profile and a duplicate of these points was created. In a similar manner, the location where the edge profile begins to level off at the top is identified. The duplicate of the left tail was rotated by 180 degrees and positioned where the ESF leveled off at the top. An example of this method is depicted in FIGS. 4A-4C. Particularly, FIGS. 4A-4E illustrate graphs showing an example method for reconstructing the right tail of the ESF with the left tail. The right tail of the ESF is identified by finding the point where the ESF levels off at the top and taking all of the points to the right. This portion of the original ESF measurement is discarded. The left tail of the ESF is identified by finding the first point where the ESF initially begins to increase and taking all the points to the left. This portion of the original ESF measurement is rotated by 180 degrees and shifted to the point where the ESF levels off at the top. A Fermi fit is applied to the reconstructed ESF and the center is identified. The center of the ESF is subsequently shifted to the origin. Finally, all of the ESF measurements that fall within the same radial bin are grouped together to create an oversampled ESF.

Figure 5:
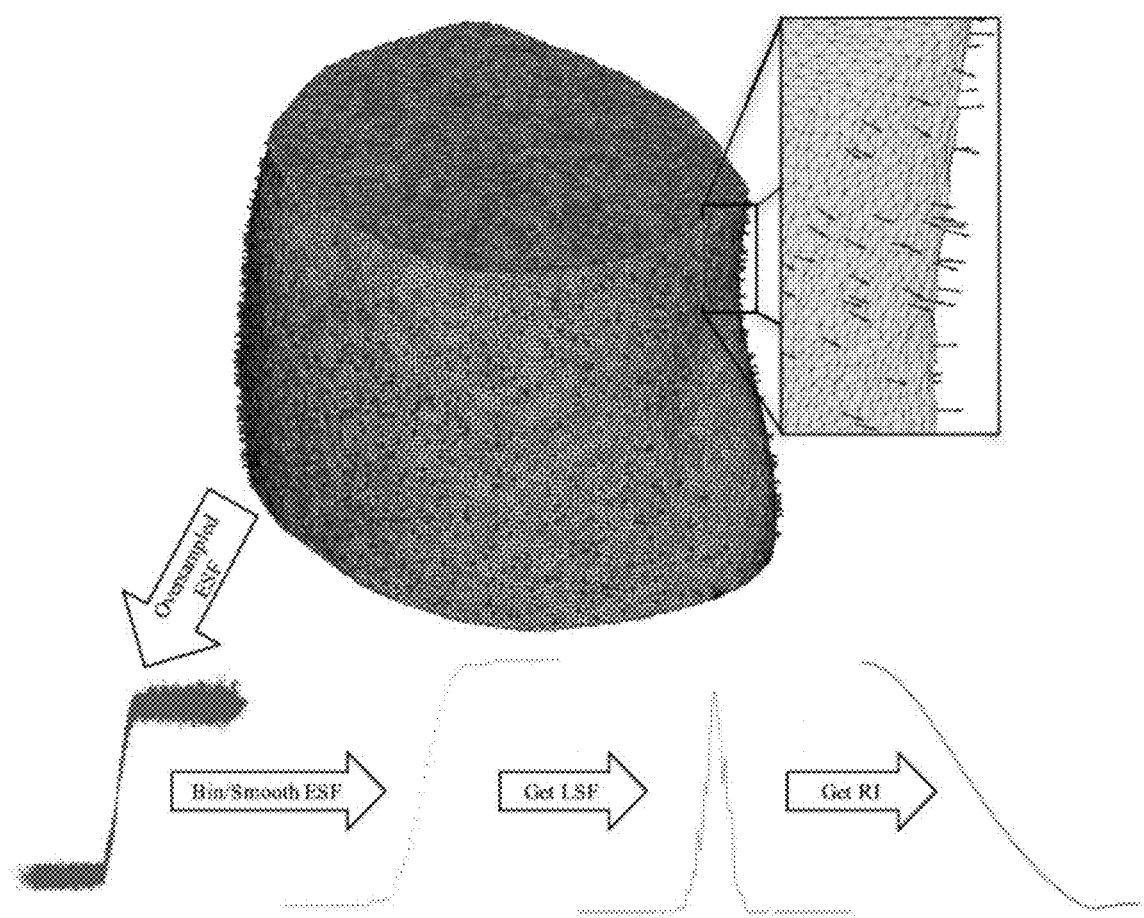
FIG. 5 is a diagram of an example method for calculating the resolution index (RI) from making an oversampled ESF measurement across the patient's skin.

A Fermi fit using the Levenberg-Marquardt least squares approach was applied to the reconstructed ESFs to center all of the measurements about a common point. Shifting all of the ESF measurements to center them about the origin and grouping those that are in the same radial bin results in an oversampled ESF. These two steps are illustrated in FIGS. 4D and 4E. The oversampled ESFs were binned by 10% of the in-plane pixel size. The binned ESFs were then conditioned before calculating the RI. A suitable approach to calculate the MTF was used in this study. It consists of differentiating the ESF to get the line-spread function. The LSF was then Fourier transformed and normalized by the value at zero to acquire the RI. An example procedure for determining the RI from the ESF measurements is summarized in FIG. 5, which illustrates a diagram of an example method for calculating the RI from making an oversampled ESF measurement across the patient's skin. The lines are Bresenham lines (Ref. 15) crossing the air-skin interface made in directions normal to the triangular faces. ESF measurements were limited to surface normal directions within ±10 degrees from the horizontal to prevent contamination from adjacent slices. The ESF is constructed from the intensity values along the Bresenham line and the distances from the center of each pixel along the line to the plane defined by the triangular face. The ESFs are grouped by their radial distance from the isocenter to create an oversampled ESF. The oversampled ESF is binned by 10% of the in-plane spatial resolution. The binned ESF is then differentiated to obtain the LSF, and the LSF is Fourier transformed to acquire the RI.

As CT image spatial resolution is dependent on both the algorithm and the kernel used to reconstruct the projection data, each of the clinical datasets was reconstructed using both filtered back-projection (FBP) and sinogram affirmed iterative reconstruction (SAFIRE), an iterative reconstructive algorithm developed by Siemens Healthcare. Kernels B20f, B31f, and B45f were used with FBP, and kernels I26f, I31f, and J45f were used with SAFIRE. The Mercury Phantom has five different cylindrical sections with diameters of 12, 18.5, 23, 30, and 37 cm. Since the largest section of the Mercury Phantom is 370 mm in diameter, the projection datasets were reconstructed with a 400 mm field of view. A 512×512 matrix was used for each image reconstruction, yielding a pixel size of 0.78×0.78 mm in the x-y plane. A slice thickness of 0.6 mm was used.

A three-step validation process was performed to determine how the proposed method compared with the current techniques for measuring the MTF in CT. The first step in the validation includes taking RI measurements along the surface of the Mercury Phantom. The algorithm was used to measure the MTF from the exterior surface of the phantom at each of the four cylindrical sections along its length. The frequency associated with 50% MTF (f50) was plotted against the distance from the center of the image to the surface of the phantom at each of the four sections to determine if the proposed algorithm could detect the radial dependence of the MTF.

In the second step of the validation process, the MTF and, subsequently, f50 were measured from the air insert inside the 23 cm diameter section of the Mercury Phantom. This step includes measuring the ESF across the air-insert/phantom interface, differentiating the ESF and taking the Fourier transform, then normalizing by the value at zero to acquire the MTF. The value of $f_{50}$ for the air inserts spans a range of distances, accounting for the finite diameter of the cylindrical air insert. Similarly, the values of $f_{50}$ measured from the patient surface span a range of distances accounting for the 10 mm width of the radial bin that the ESF measurements were placed in. A linear fit was applied to the data from the first step and extrapolated back to the $f_{50}$ measurement of the air insert. The linear fit was chosen based on data presented by La Riviere and Vargas. As the air insert is closer to the isocenter than the phantom surfaces, it is expected to produce a larger value for $f_{50}$ than the surface measurements.

Finally, in the third step of the validation, the patient-specific RI measurements were compared with the Mercury Phantom measurements. The $f_{50}$ measurements from patient images were presented in a cloud cluster form around the data from the first two steps of the validation procedure. Moreover, the $f_{50}$ measurements from the 160-170 mm radial bin were plotted against Mercury Phantom $f_{50}$ measurements at 165 mm from the isocenter to investigate the sensitivity of the proposed algorithm to the reconstruction technique. A linear fit was applied to these data and the slope and trend of the line were evaluated.

Figure 6:
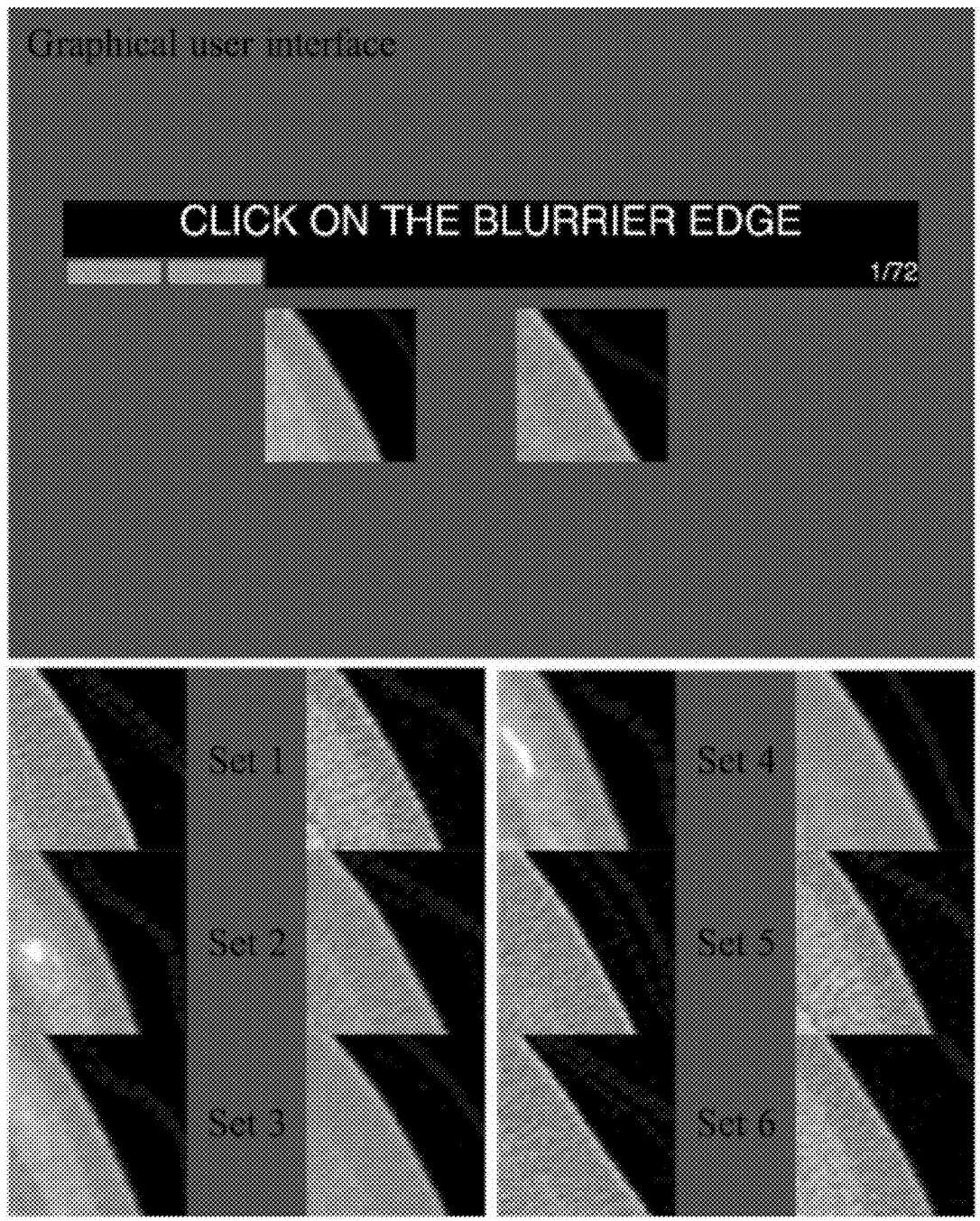
FIG. 6 is an example picture of the graphical user interface created for the observer study, as well as six example edge pairs.

The spread in the $f_{50}$ measurements in the 160-170 mm radial bin was quantified. An observer study was conducted to determine if the measured differences in spatial frequency for a given kernel across patients were reflective of visually discernable sharpness differences. Seven imaging scientists participated in the study. The observers were shown 72 pairs of edges that were extracted from different images that were reconstructed with the same reconstruction algorithm and kernel. Using a two-alterative-forced-choice (2AFC) methodology, they were instructed to select the edge that they perceived to be blurrier. The readings were preceded with a training read of 64 image pairs. An example picture of the graphical user interface created for the observer study, as well as six example edge pairs, is shown in FIG. 6. Particularly, a top of portion of FIG. 6 shows an example GUI utilized for the study. The bottom portion of FIG. 6 shows six example sets of edge pairs that were shown to the observers. Each edge pair consists of two images reconstructed with identical reconstruction techniques, but taken from two different clinical datasets.

Figure 7A:
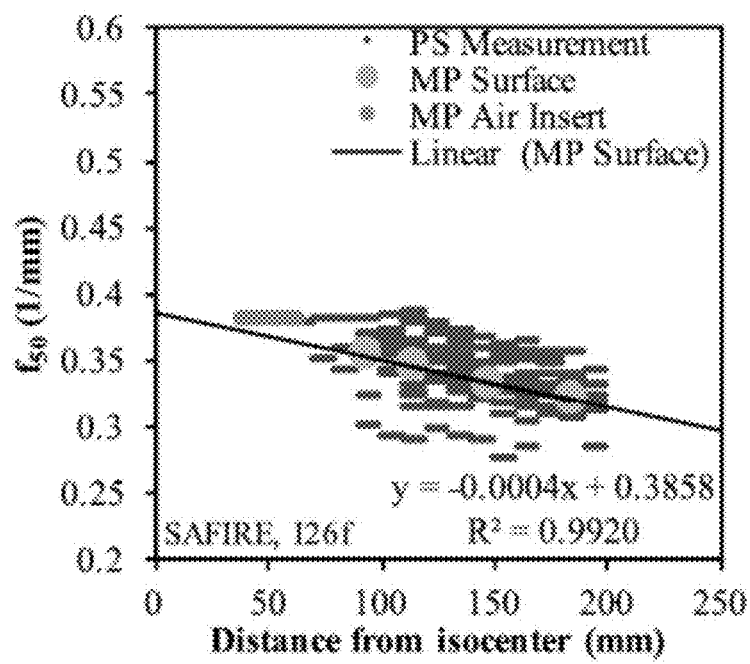
FIGS. 7A-7F show graphs of results from $f_{50}$ measurements made from clinical datasets.
Figure 7B:
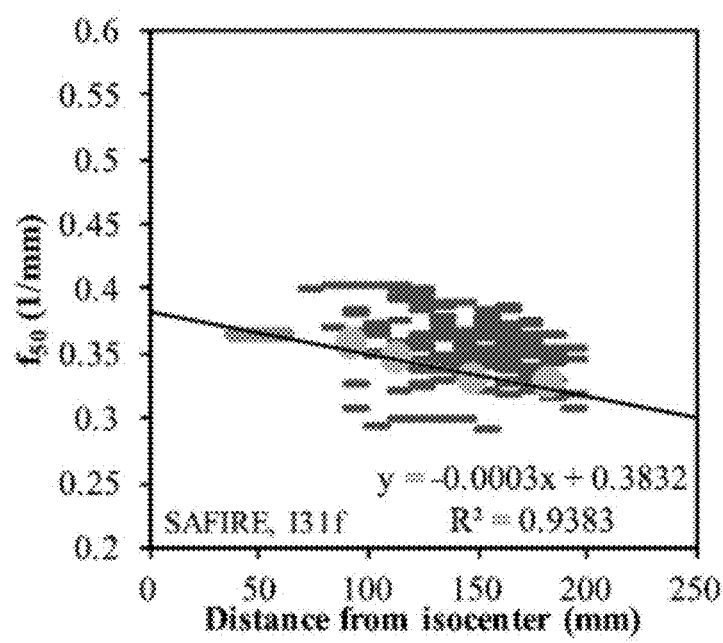
Figure 7C:
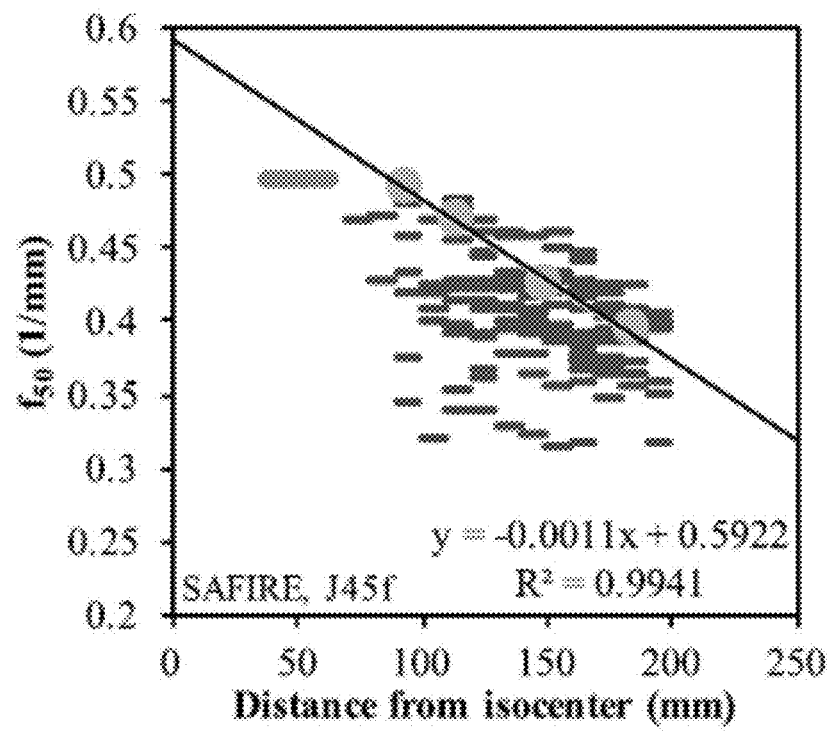
Figure 7D:
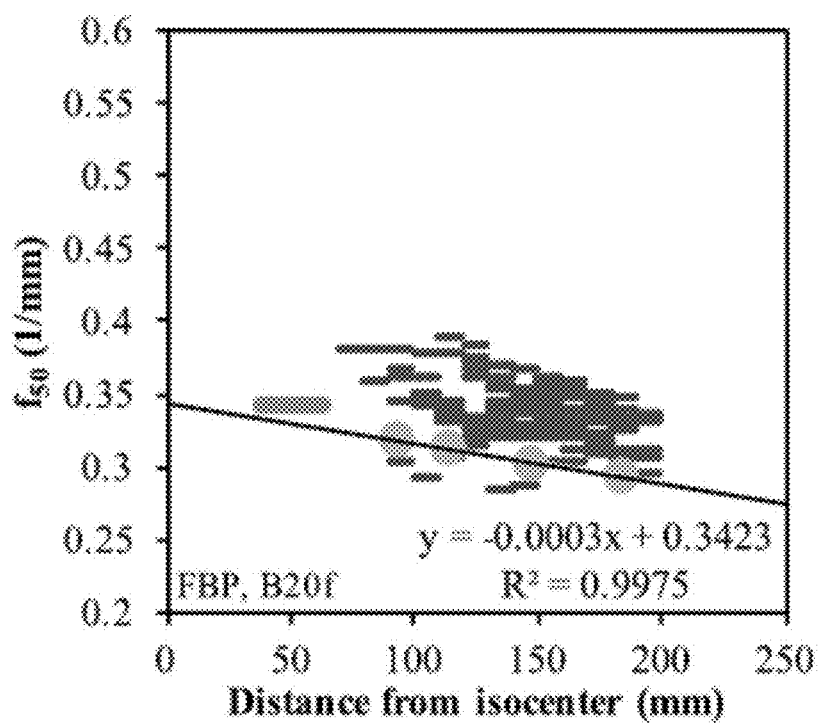
Figure 7E:
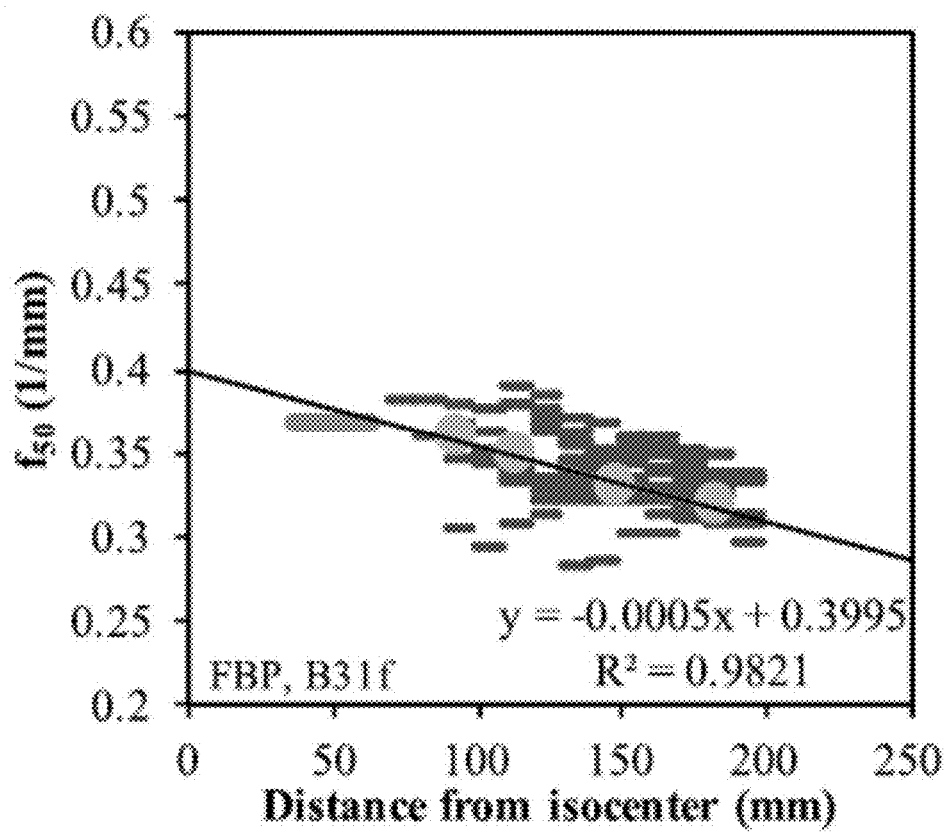
Figure 7F:
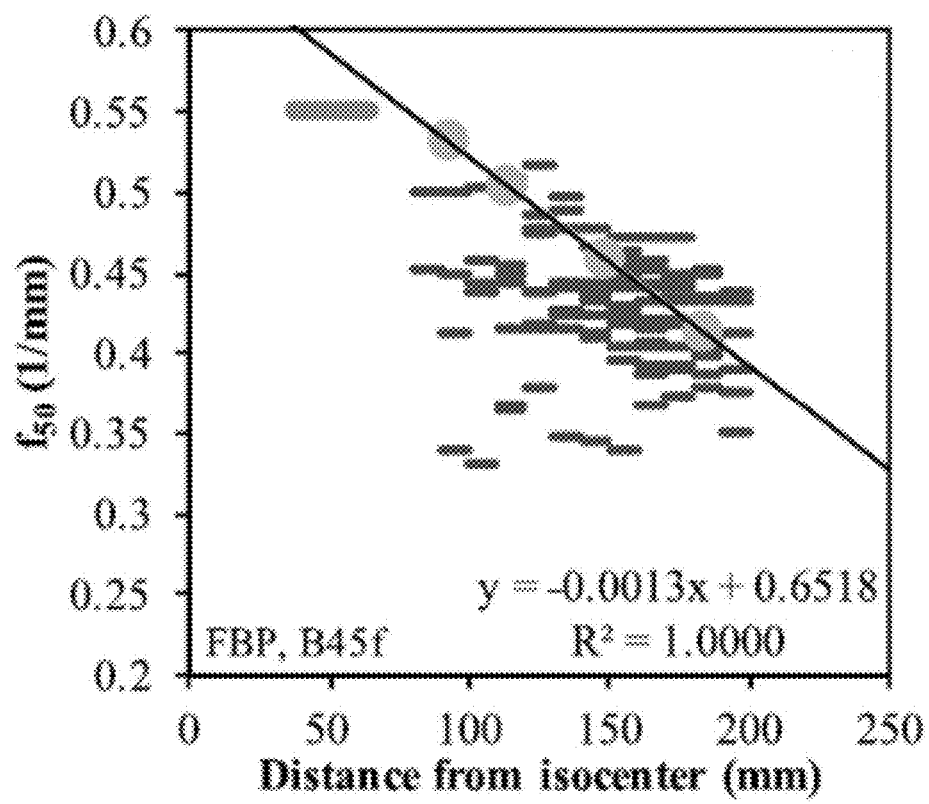

FIGS. 7A-7F show graphs of results from $f_{50}$ measurements made from clinical datasets. Particularly, FIGS. 7A-7F show the results of the first two steps in the validation process. FIGS. 7A-7F also show the results of the $f_{50}$ measurements from the third step of the validation. FIG. 7A shows SAFIRE with I26f. FIG. 7B shows SAFIRE with I31f. FIG. 7C shows SAFIRE with J45f. FIG. 7D shows FBP with B20f. FIG. 7E shows FBP with B31f. FIG. 7F shows FBP with B45f. Mercury phantom is abbreviated as "MP" and patient-specific is abbreviated as "PS." The cloud of data points around the linear fit line represents the patient specific $f_{50}$ measurements. Each measurement spans a range of radial distances from the center corresponding to the length of the radial bin that the measurements were placed in. Three observations can be made from the data in FIGS. 7A-7F. The first is that the data exhibit a decreasing trend, indicating that the patient specific algorithm is capable of capturing the radial dependence of the MTF. The second is that the $f_{50}$ measurements vary with the reconstruction kernel used, where the value of $f_{50}$ increases with increasing kernel strength. Finally, there is a spread in the $f_{50}$ measurements about the linear fit lines. This spread indicates that the spatial resolution varies among different patient CT datasets. In other words, some images are blurrier than others. Additionally, the spread is larger for stronger kernels.

Figure 8A:
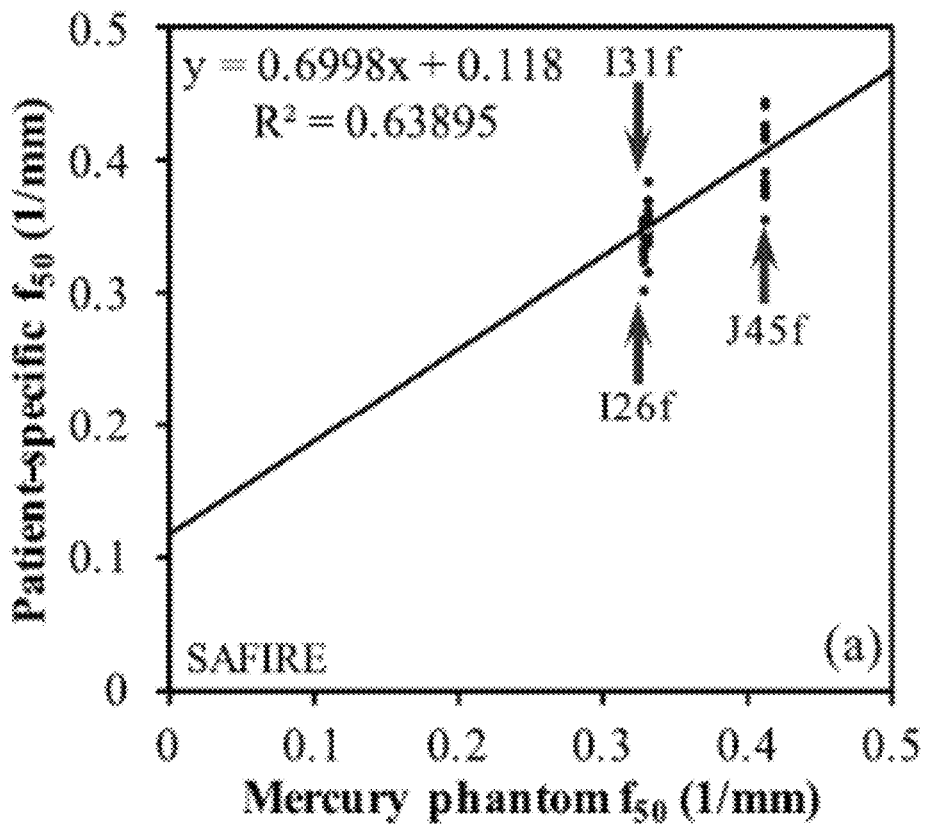
FIGS. 8A and 8B are plots of f50 measured from patient images versus f50 measured from a conventional resolution measurement phantom.
Figure 8B:
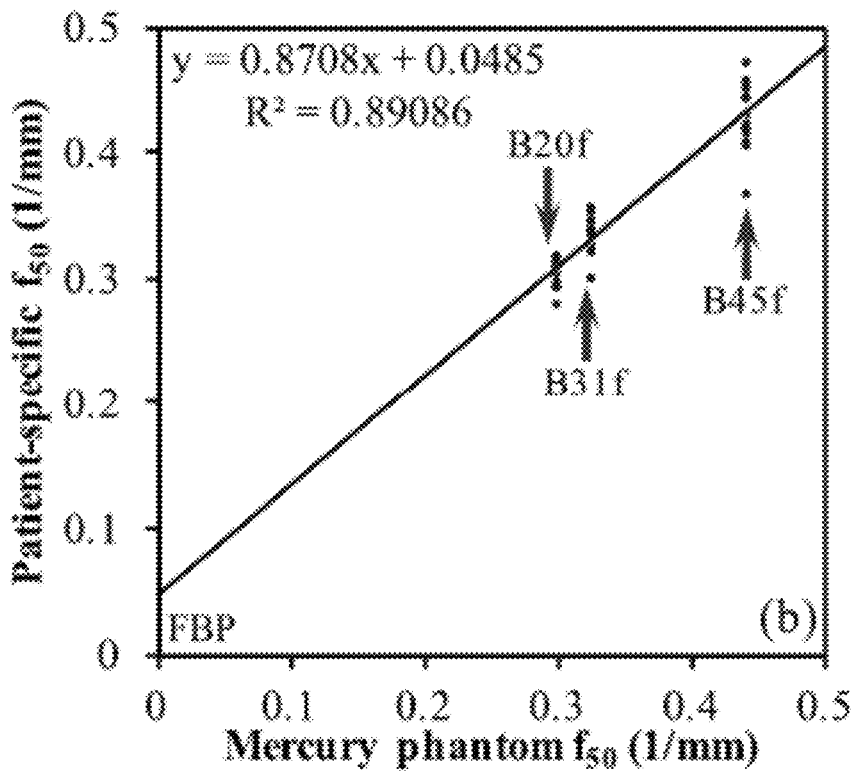

FIGS. 8A and 8B are plots of f50 measured from patient images versus f50 measured from the Mercury Phantom. Referring to FIGS. 8A and 8B, the figures show results from the sensitivity study of an example method in accordance with embodiments of the present disclosure. The $f_{50}$ measurements located in the 160-170 mm bin from patient datasets are plotted against the $f_{50}$ measurements from the Mercury Phantom at 165 mm. A linear fit was applied to the data to establish the sensitivity of the proposed technique. A slope less than one would indicate that the Mercury Phantom predicted a higher $f_{50}$ than was measured in the patient images, equal to one would indicate that the measured $f_{50}$ agreed with Mercury Phantom predictions, and greater than one would indicate that the measured $f_{50}$ was greater than Mercury Phantom predictions. Furthermore, a positive slope would indicate that the proposed technique was sensitive to changes in the reconstruction kernel, and a slope of zero would indicate that the proposed technique was insensitive to the reconstruction kernel. As shown in FIGS. 8A and 8B, the slope of the fit line is positive and less than one for both reconstruction algorithms.

Figure 9:
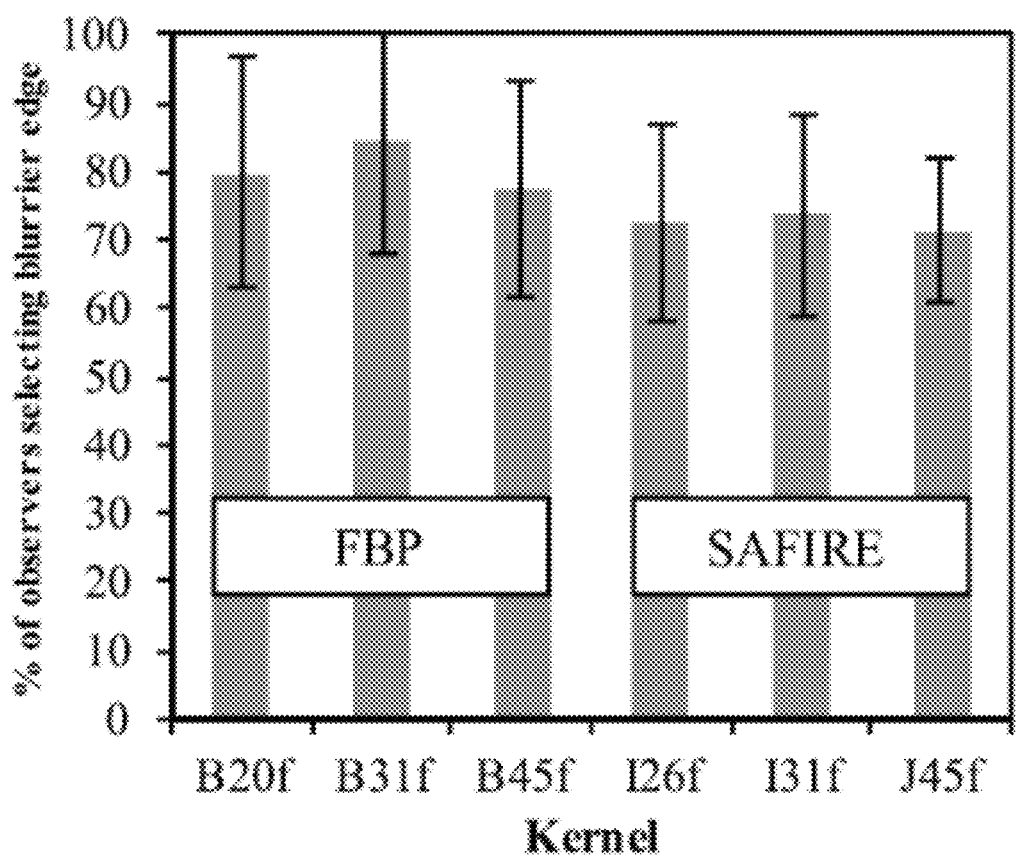
FIG. 9 shows the results from the observer study.

FIG. 9 shows the results from the observer study. Error bars are reported as ±1 standard deviation to indicate the degree of variability in the observers' decisions. The data presented are the percentage of observers selecting the blurrier edge for each of the reconstruction algorithms and reconstruction kernels investigated in this study. The highest percentage of observers selecting the blurrier edge was 84.5% corresponding to the B31f kernel used in FBP. Moreover, the lowest percentage of observers selecting the blurrier edge was 71.4% corresponding to the J45f kernel used in SAFIRE. Overall the percentage of observers selecting the blurrier edge was higher for FBP than for SAFIRE across all reconstruction kernels.

Characterizing spatial resolution is an essential step in quantifying the overall quality of CT images, assessing the performance of the imaging system, and optimizing clinical protocols. Conventional techniques based on phantom measurements are sufficient in characterizing the inherent spatial resolution capability of a CT system. However, there are limitations in applicability of such measures to the actual spatial resolution of clinical images. Phantom measurements are based on static, uniform objects inside the FOV. Clinical images are subject to blurring processes (including patient motion and scan variability) that are not reflected in idealized phantom images. This work documents this difference and demonstrates a methodology by which spatial resolution can be measured in actual clinical images. Moreover, this technique accounts for the skin as an organ, sweat, and contour changes, which can all affect CT image quality.

The sensitivity study showed that there was a large spread in the measured spatial frequencies, even when the images were reconstructed with the same reconstruction algorithm and kernel. This result may be contrary to what is currently accepted. Most researchers and clinical physicists follow the idea that spatial resolution in clinical images is determined by phantom measurements. That is, they ascribe the MTF a property reflective of the imaging system only. The results presented herein show that the concept of the MTF can be repurposed as a reflection of spatial resolution in clinical images. Resolution indices (MTF analogs) measured from clinical images show variations across clinical images even when identical image reconstruction parameters are used. The fact that human observers can visually perceive these variations substantiates that spatial resolution is a clinical measureable, varying, and relevant metric of clinical image quality.

FIG. 8 exhibits a spread in the f50 measurements, which raises the question of how can spatial resolution vary among clinical images that were reconstructed with identical reconstruction algorithms and kernels. One avenue in which this is possible is when automatic exposure control is used. As the tube current varies along the patient, so too does the size of the effective focal spot due to focal spot blooming. It was determined that focal spot blooming was a source of a portion of the spread in f50, and the spread was reduced by 25% after correcting for focal spot blooming. Tube potential can also affect the size of the effective focal spot. However, this was not a source of the spread in FIG. 8, because the same tube potential was used for all of the scans. Another potential source of the spread in the measured f50 values is patient motion. However, this hypothesis has yet to be proven in the context of the present work. Image denoising methods should not have an impact on the results. An investigation in the relationship between image noise and f50 showed that, for a given reconstruction technique, the two values were not correlated.

Vendor proprietary reconstruction techniques, such as sonogram smoothing, can also produce spatial resolution irregularities across clinical datasets, and they are likely an additional cause for the spread in the $f_{50}$ measurements. Sinogram smoothing techniques are implemented to reduce noise, but they can lead to spatial resolution nonuniformities by applying different weighting factors to different clinical datasets.

One example advantage of the proposed technique is that it allows for the characterization of image spatial resolution on a patient-specific basis. It has been shown that clinical images encounter varying amounts of blur, even when they are reconstructed with the same reconstruction algorithm and kernel. This implies that not all images may have the same spatial resolution that is predicted by phantom measurements. The proposed technique can be used to measure the degree of variability in image quality among clinical images and use this information to optimize clinical protocols in an effort to make image quality consistent throughout all scanners in the clinic.

Quantifying the spatial resolution characteristics on an image-specific basis would allow for patient specific image quality tracking. Every patient that receives a CT scan in the clinic can have information about the image quality of the dataset stored in his or her patient record. This information can then be analyzed along with the acquisition settings to determine the optimal settings that balance image quality and dose for their next scan. In that way, CT dose monitoring can be extended to performance monitoring including image quality attributes of noise and now also spatial resolution. This method for characterizing CT spatial resolution has some limitations. Using harder kernels to reconstruct the dataset results in a noisier image set. The higher noise can make it difficult to extract clean ESFs from the air-skin interface, as the number of individual ESF measurements to produce the oversampled ESF is insufficient.

In accordance with embodiments, systems and methods are disclosed for measuring and presenting image contrast or another image characterization. An example contrast measurement method may be based on multiple steps. In this example operating on a clinical dataset, first the patient's body may be segmented from the dataset to isolate it from other objects in the field of view (FOV), such as clothing, wires, and other objects. The table cushion may pose a problem for segmentation because it often times has a similar HU to skin. Seven thresholds may be identified based on an independent database of CT images to segment the patient body from the background. A morphological hole filling operation may subsequently be applied to fill in low-density regions inside the patient with HUs outside of the seven thresholds. The result may be a binary volume of the patient, splitting the CT dataset into a foreground and a background. All subsequent processes may be applied to the foreground dataset.

Figure 10:
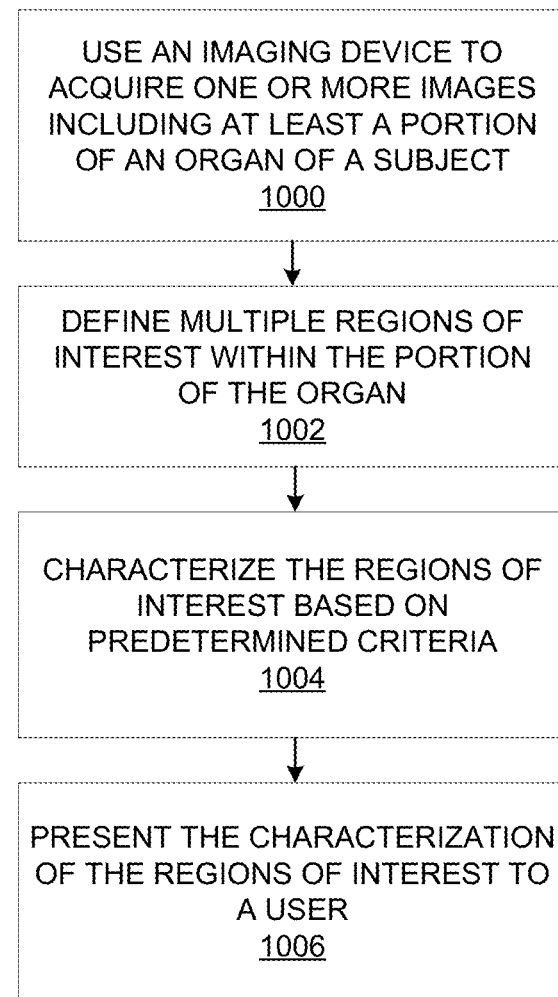
FIG. 10 is a flow diagram of an example method for determining a quality metric of an acquired CT image in accordance with embodiments of the present disclosure.

In accordance with embodiments, FIG. 10 illustrates a flow diagram of an example method for determining a quality metric of an acquired CT image in accordance with embodiments of the present disclosure. In this example, the method is described as being implemented by the system shown in FIG. 1, although it should be understood that the method may be implemented by any other suitable imaging system. Alternative systems may be CT imaging systems or non-CT imaging system, such as MRI.

Referring to FIG. 10, the method includes using 1000 an imaging device to acquire one or more images including at least a portion of an organ of a subject. For example, the system of FIG. 1 may be operated to acquire multiple CT images of a portion of the patient's body 104. The system may direct x-rays towards and through the body 104. The detector elements of the x-ray detector array 103 may receive the x-rays projected through the body 104. The DAS 111 can receive analog data from the detector elements and can convert the data to digital signals representative of the body 104. The image reconstructor 112 can perform image reconstruction of the digital signals and output the reconstructed image data to the computing device 113.

FIG. 10 also includes defining 1002 multiple regions of interest within the portion of the organ. FIG. 10 also includes characterizing 1004 the regions of interest based on predetermined criteria. Continuing the aforementioned example, the acquired images may include lungs. The memory 132 and processor(s) 130 may segment the lungs from the dataset using Otsu thresholding or another suitable thresholding technique. The voxels within the lung section of the histogram define a lung mask and a corresponding lung dataset. The lung dataset contained both lung tissue and lung vasculature. Otsu thresholding was used again so sample lung tissue independent from lung vasculature. A circular mask representing a region of interest (ROI) was convolved with each slice of the lung tissue mask. The resulting intensity map was used to identify the optimal locations to sample the lung tissue. The number of ROIs corresponding to maximum intensity values of the intensity map were gradually increased to achieve a sufficient sample distribution. Five ROIs created a histogram with a large number of HU samples. The histogram of the ROIs was extracted and further scalarized in terms of the mean and standard deviation. FIG. 10 includes presenting 1006 the characterization of the regions of interest to a user. For example, the histogram of the ROIs may be presented via the user interface 115 shown in FIG. 1.

Figures 11A, 11B, 11C:
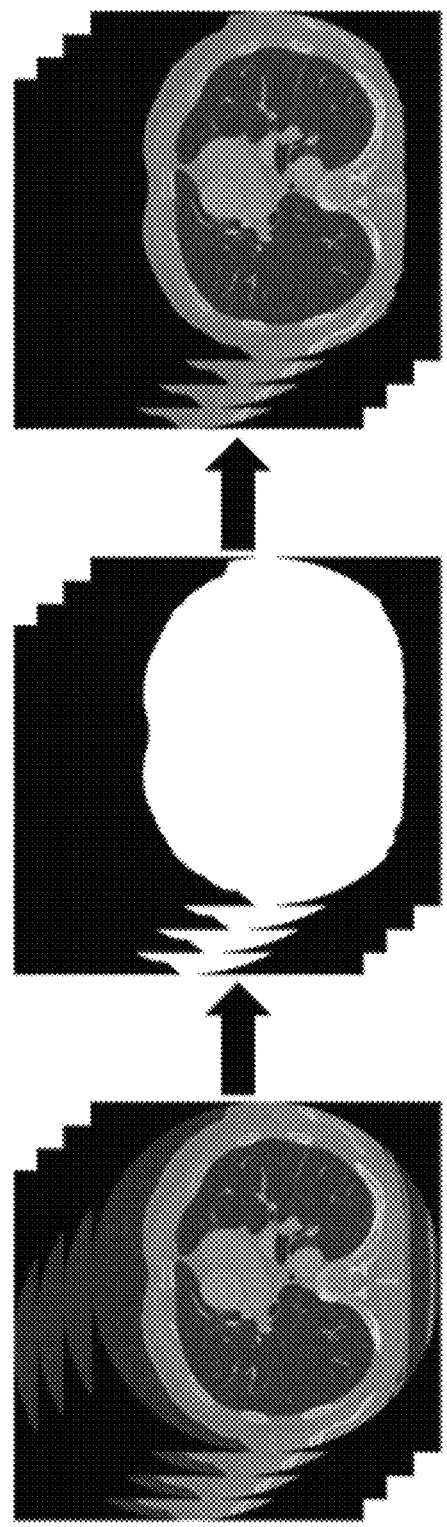
FIGS. 11A-11C are different images depicting a sequence of an example method for segmenting out the patient's body from a CT dataset in accordance with embodiments of the present disclosure.
Figure 12A:
FIGS. 12A-12E is a flow diagram of an example method for determining the lung HU histogram in accordance with embodiments of the present disclosure.
Figure 12B:
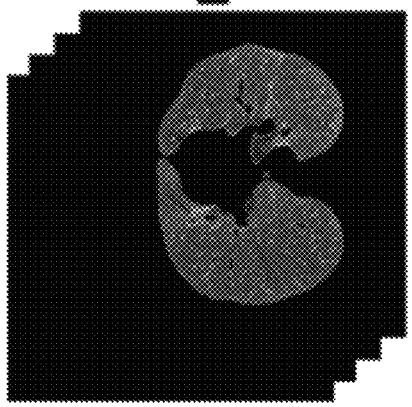
Figure 12C:
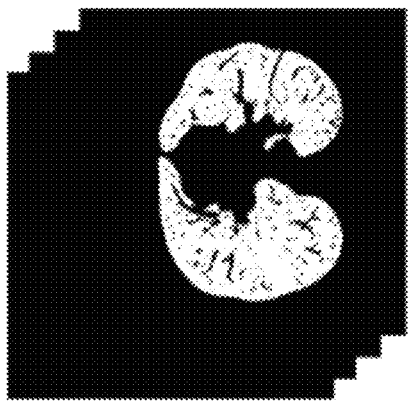
Figure 12D:
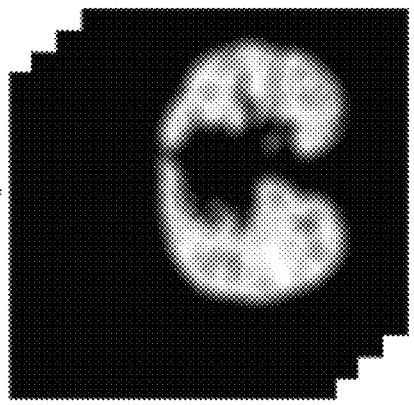
Figure 12E:
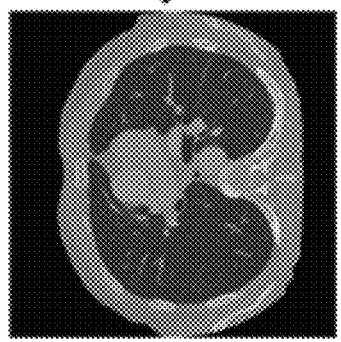

In an example, FIGS. 11A-11C illustrates different images depicting a sequence of an example method for segment out the patient's body from a CT dataset in accordance with embodiments of the present disclosure. Referring to FIG. 11A, the method may begin with a CT dataset acquired from a patient. At FIG. 11B, the patient's body may be segmented to create a binary mask of the patient. At FIG. 11C, values of −3024 may be assigned to voxels that are not classified as the patient.

For lung histogram measurement, lungs may be segmented from the CT dataset using Otsu thresholding or another suitable thresholding technique. In an example, three thresholds may be used to split the histogram of each slice of the CT dataset into three sections: one for lung tissue, one for soft tissue, and one for bones. The voxels within the lung section of the histogram can define a lung mask and a corresponding lung dataset. The lung dataset may contain both lung tissue and lung vasculature. Otsu thresholding or another suitable thresholding technique may be used so sample lung tissue independent from lung vasculature. A circular mask representing a region of interest (ROI) may be convolved with each slice of the lung tissue mask. The resulting intensity map may be used to identify the optimal locations to sample the lung tissue. The number of ROIs corresponding to maximum intensity values of the intensity map may be gradually increased to achieve a sufficient sample distribution. In this example, five ROIs created a histogram with a large number of HU samples. The histogram of the ROIs may be extracted and further scalarized in terms of the mean and standard deviation.

A flow diagram of an example method for determining the lung HU histogram in accordance with embodiments of the present disclosure is shown in FIGS. 12A-12E. At FIG. 12A, the method may begin with a CT dataset. At FIG. 12B, the patient's lungs may be segmented out using a global Otsu threshold. At FIG. 12C, the vasculature may be removed from the lung segmentation, and a binary mask may be created. At FIG. 12D, the slices of the binary mask may be convolved with a binary circle to create an intensity map. Subsequently at FIG. 12E, the ROIs may be placed in the locations of the five maximum intensity values from the intensity map.

For liver histogram measurement, a cylindrical ROI inside the liver is sufficient to measure the liver histogram. Since the liver is located directly below the right lung, the centroid of the right lung in the slice where its cross sectional area was at maximum may be identified to determine the center of the cylindrical ROI. The bottom slice of the right lung may be used as the z-location for the ROI.

The center of the cylindrical ROI was positioned at the (x, y, z) location. Circular ROIs may be placed in the two slices above and below the original z location using the same (x, y) coordinates. That is, circular ROIs can be placed in the slices from z−2 to z+2. The z-location of the centroid of the ROI was optimized to ensure it only includes the liver. This was done by computing the skewness of the histogram of HUs in the cylindrical ROI, and adjusting the ROI up or down until the histogram represented a Gaussian distribution. The histogram of the ROI may be extracted and further scalarized in terms of the mean and standard deviation.

In accordance with embodiments, FIG. 13A-13E illustrates images showing a sequence of a flow diagram of an example method for determining the liver HU histogram. At FIG. 13A, a lung mask may be provided. At FIG. 13B, the left lung may be removed from the lung mask. Subsequently at FIG. 13C, the slice with the maximum cross-sectional area of the right lung may be found. Also, at FIG. 13C, the centroid may be found. At FIG. 13D, the last slice of the lung (bottom of the lung) may be found. Now the x, y, and z locations of the center of the circular ROIs are known. At FIG. 13E, ROIs are placed in the 5 slices where the liver is known to be.

Using an IRB-approved protocol, the automated technique was validated against manual segmentation of the organs in 15 non-contrast enhanced datasets and 15 contrast enhanced datasets. ROIs of similar sizes and shapes that were used in the automated technique were manually placed in five slices of the liver and lung, and the corresponding histograms were constructed and scalarized.

The sensitivity of the automated technique was investigated by comparing the metrics determined from the automated technique to those determined by manual segmentation. The mean of the HUs inside the automatically selected ROIs of the liver and lung were plotted against the mean of the HUs inside the manually selected ROIs. A linear fit was applied to each dataset to establish the sensitivity of the proposed automated technique and the coefficient of determination, $R^2$, was computed.

Figure 14A:
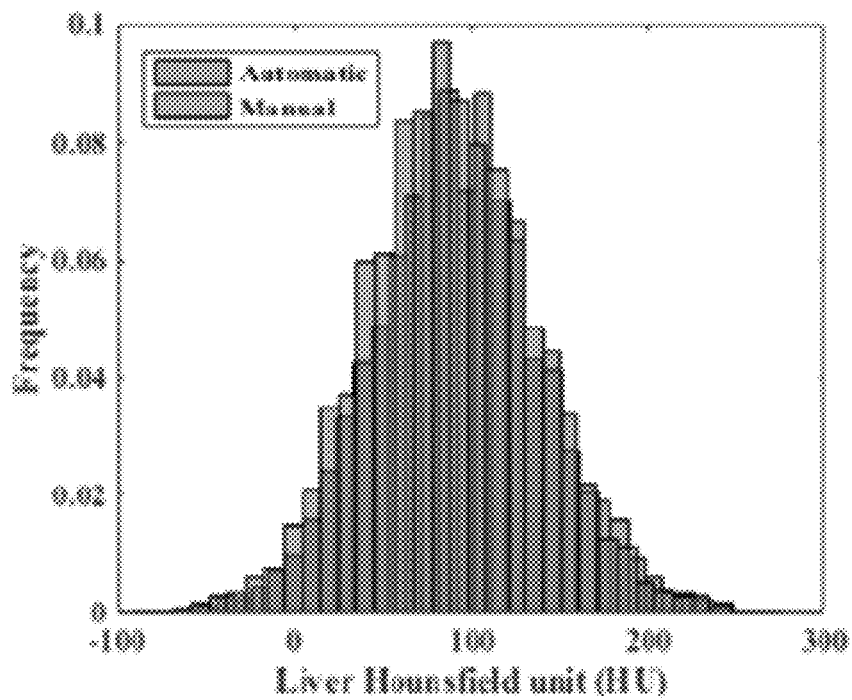
FIGS. 14A and 14B are graphs showing example sets of histograms of the HUs for the various organs determined using the automated technique compared against the manual technique.
Figure 14B:
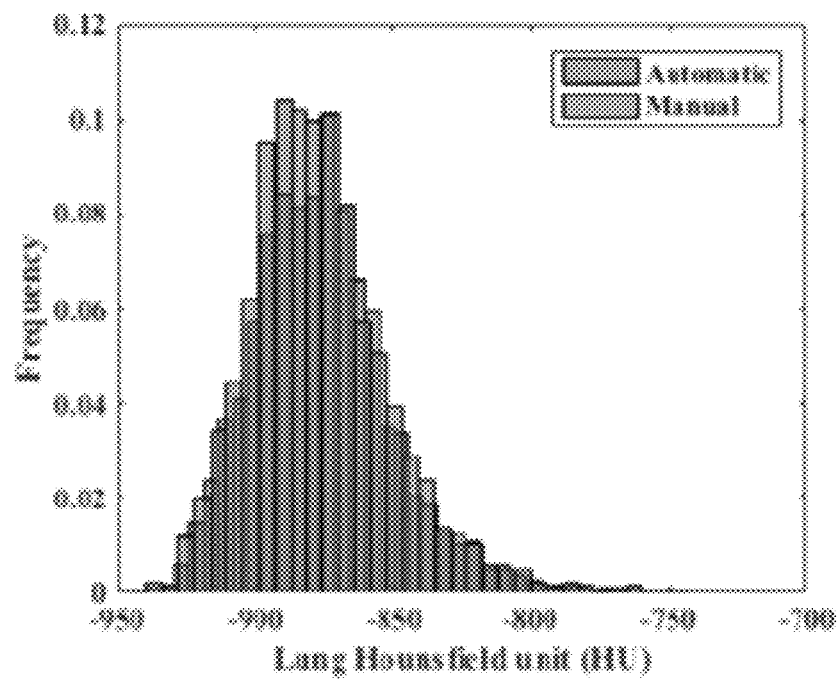

FIGS. 14A and 14B are graphs showing example sets of histograms of the HUs for the various organs determined using the automated technique. The histograms shown are for a contrast enhanced exam. The histograms constructed from the manual technique are also included for comparison. The histograms of the liver and lung exhibit the expected Gaussian distribution for both the automated and manual technique. These histograms demonstrate qualitative agreement between the automated and manual techniques. These histograms were measured from a contrast enhanced chest exam. The histograms were normalized so that the integral would be equal to one.

Figure 15A:
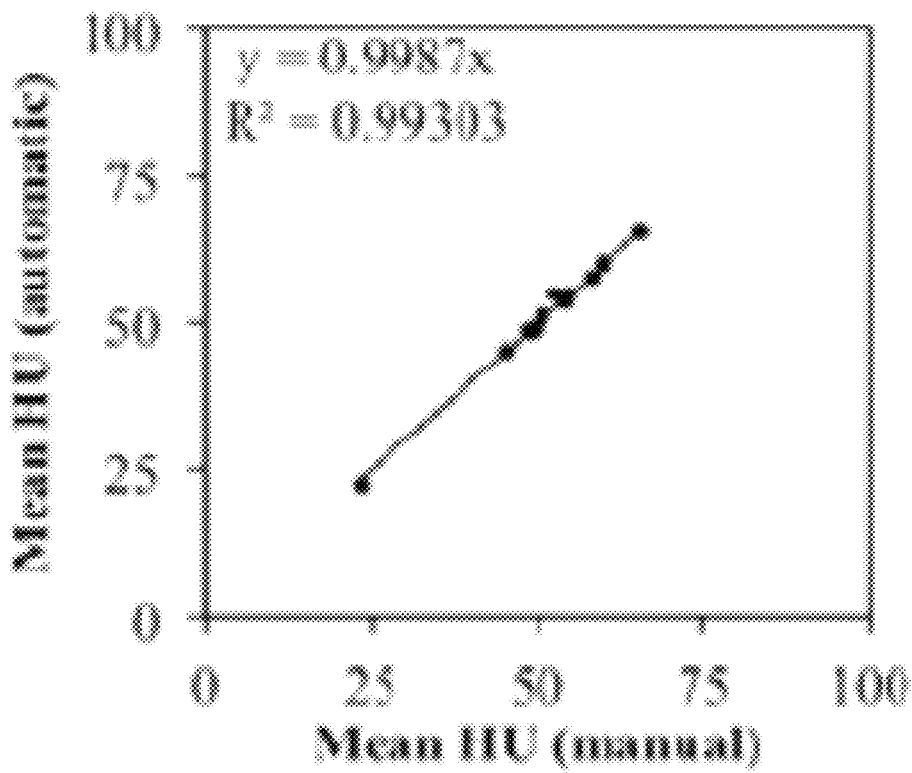
FIGS. 15A and 15B are graphs showing the plots of the metrics determined from the automated technique plotted against those determined from the manual technique for non-contrast enhanced exams.
Figure 15B:
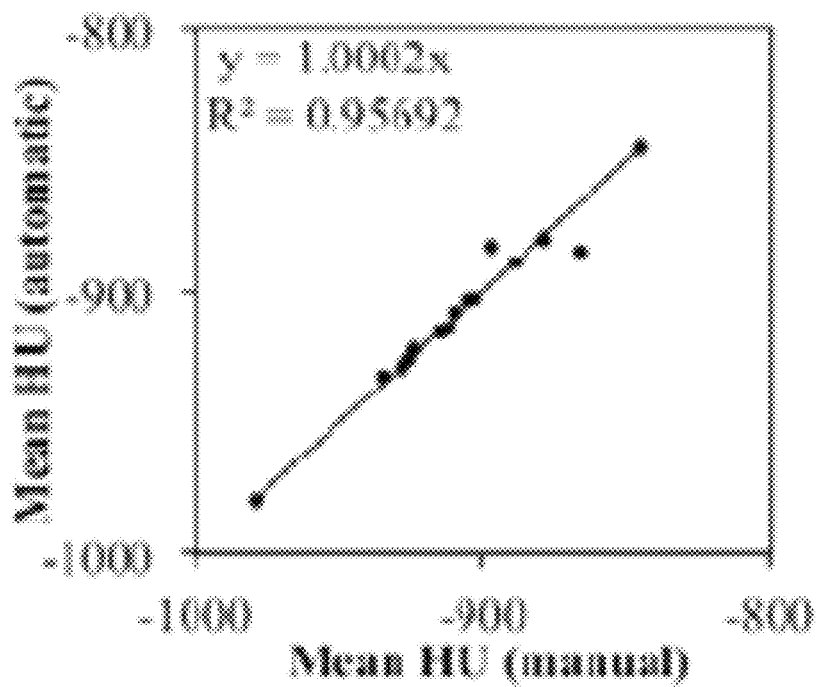

FIGS. 15A and 15B are graphs showing the plots of the metrics determined from the automated technique plotted against those determined from the manual technique for non-contrast enhanced exams. The plots are sensitivity plots for non-enhanced chest CT exams. These plots were generated from measurements of 15 clinical datasets. A linear fit was applied to the data. FIG. 15A shows the liver, and FIG. 15B shows the lung.

Figure 16A:
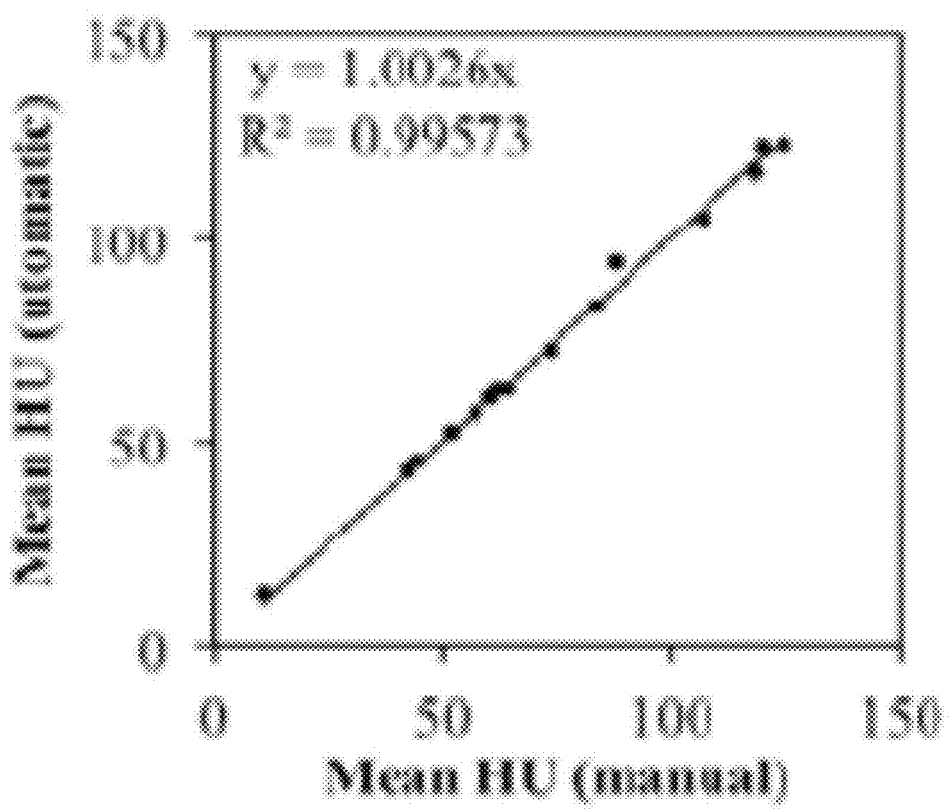
FIGS. 16A and 16B are graphs showing the plots of the metrics determined from the automated technique plotted against those determined from the manual technique for contrast enhanced exams.
Figure 16B:
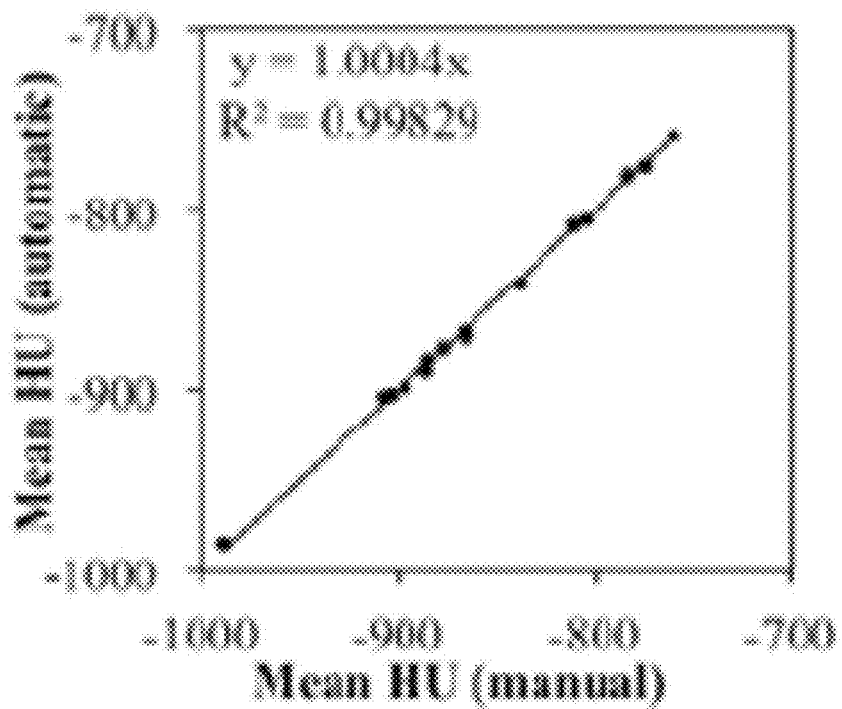

Similarly, FIGS. 16A and 16B are graphs showing the plots of the metrics determined from the automated technique plotted against those determined from the manual technique for contrast enhanced exams. The slope of the fit line is near unity for all of the plots shown. Moreover, the coefficient of determination is high for all of the fit lines, indicating a good fit. The plots are sensitivity plots for contrast enhanced chest CT exams. These plots were generated from measurements of 15 clinical datasets. A linear fit was applied to the data. FIG. 16A shows the liver, and FIG. 16B shows the lung.

Overall, the algorithm successfully measured the histograms of the two organs in both contrast and non-contrast enhanced chest CT exams for all of the cases examined. The automated measurements were in agreement with manual measurements. The algorithm exhibits high sensitivity and accuracy as indicated by the near unity slope of the automated versus manual measurement plots with high coefficients of determination, $R^2$, values ranging from 0.88 to 0.99.

Computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
    using an imaging device to acquire one or more images of a subject;
    defining skin of the subject in the acquired one or more images;
    characterizing edge sharpness across the skin of the subject via edge profile measurements;
    grouping the edge profile measurements by a radial distance of the edge profiles from an isocenter of the imaging device to generate oversampled edge profile measurements;
    determining the oversampled edge profiles that are a predetermined amount of in-plane resolution for obtaining an edge gradient profile; and
    determining a quality metric of the acquired one or more images based on the edge gradient profile.

2. The method of claim 1, wherein defining an interface between skin of the subject and outside the skin of the subject comprises constructing a surface definition of a portions of the subject in the one or more images.

3. The method of claim 2, wherein the surface definition comprises one of a polygon mesh and a polyhedron mesh.

4. The method of claim 1, wherein using an imaging device comprises using a computed tomography (CT) imaging device to acquire one or more CT images of the subject.

5. The method of claim 1, wherein determining the quality metric of the acquired image comprises determining at least one of a spatial resolution, noise, and image contrast of the acquired image.

6. The method of claim 1, wherein characterizing edge sharpness comprises generating edge spread function (ESF) measurements across the skin of the subject.

7. The method of claim 6, wherein segmenting the portion of the subject comprises using a thresholding technique.

8. The method of claim 1, wherein determining a quality metric comprises applying a Fourier transform to a line spread function (LSF).

9. The method of claim 8, further comprising obtaining a resolution metric based on the Fourier transform.

10. The method of claim 1, further comprising presenting a representation of the quality metric to a user.

11. The method of claim 10, wherein presenting the quality metric comprises using a display to present the representation of the quality metric.

12. The method of claim 1, wherein the one or more images are contrast enhanced images.

13. The method of claim 1, wherein the edge gradient profile comprises a line spread function (LSF).

14. A system comprising:
    an imaging device configured to acquire one or more images of a subject; and
    a computing device comprising at least one processor and memory that:
        defines skin of the subject in the acquired one or more images;
        characterizes edge sharpness across the skin of the subject via edge profile measurements;
        groups the edge profile measurements by a radial distance of the edge profiles from an isocenter of the imaging device to generate oversampled edge profile measurements;
        determines the oversampled edge profiles that are a predetermined amount of in-plane resolution for obtaining an edge gradient profile; and
        determines a quality metric of the acquired one or more images based on the edge gradient profile.

15. The system of claim 14, wherein defining an interface between skin of the subject and outside the skin of the subject comprises constructing a surface definition of a portions of the subject in the one or more images.

16. The system of claim 15, wherein the surface definition comprises one of a polygon mesh and a polyhedron mesh.

17. The system of claim 14, wherein using an imaging device comprises using a computed tomography (CT) imaging device to acquire one or more CT images of the subject.

18. The system of claim 14, wherein determining the quality metric of the acquired image comprises determining at least one of a spatial resolution, noise, and image contrast of the acquired image.

19. The system of claim 14, wherein characterizing edge sharpness comprises generating edge spread function (ESF) measurements across the skin of the subject.

20. The system of claim 19, wherein segmenting the portion of the subject comprises using a thresholding technique.

21. The system of claim 14, wherein determining a quality metric comprises applying a Fourier transform to a line spread function (LSF).

22. The system of claim 21, further comprising obtaining a resolution metric based on the Fourier transform.

23. The system of claim 14, further comprising presenting a representation of the quality metric to a user.

24. The system of claim 23, wherein presenting the quality metric comprises using a display to present the representation of the quality metric.

25. The system of claim 14, wherein the one or more images are contrast enhanced or non-contrast enhanced images.

26. The system of claim 14, wherein the edge gradient profile comprises a line spread function (LSF).

* * * * *